(12) United States Patent
Yamamoto

(10) Patent No.: US 10,932,539 B2
(45) Date of Patent: Mar. 2, 2021

(54) OPERATING HANDLE DEVICE

(71) Applicant: Daiichi Kosho Ltd., Tokyo (JP)

(72) Inventor: Hideo Yamamoto, Hiroshima (JP)

(73) Assignee: DAIICHI KOSHO LTD., Tokyo (JP)

(*) Notice: Subject to any disclaimer, the term of this patent is extended or adjusted under 35 U.S.C. 154(b) by 0 days.

(21) Appl. No.: 16/543,347

(22) Filed: Aug. 16, 2019

(65) Prior Publication Data
US 2019/0365071 A1 Dec. 5, 2019

Related U.S. Application Data

(63) Continuation of application No. 15/347,754, filed on Nov. 9, 2016, now Pat. No. 10,426,240.

(30) Foreign Application Priority Data

May 20, 2016 (JP) .............................. JP2016-101725

(51) Int. Cl.
*A45C 13/26* (2006.01)
*B62B 5/06* (2006.01)

(52) U.S. Cl.
CPC ............ *A45C 13/262* (2013.01); *B62B 5/065* (2013.01); *B62B 5/067* (2013.01); *A45C 2013/265* (2013.01); *A45C 2013/267* (2013.01)

(58) Field of Classification Search
CPC ............ A45C 13/262; A45C 2013/265; A45C 2013/267; B62B 5/065; B62B 5/067
See application file for complete search history.

(56) References Cited

U.S. PATENT DOCUMENTS

| 5,379,486 | A |   | 1/1995  | Wang |            |
|-----------|---|---|---------|------|------------|
| 5,581,846 | A | * | 12/1996 | Wang | A45C 13/262 |
|           |   |   |         |      | 16/113.1   |
| 5,628,088 | A | * | 5/1997  | Chen | A45C 13/262 |
|           |   |   |         |      | 16/113.1   |
| 5,630,250 | A | * | 5/1997  | Chou | A45C 13/262 |
|           |   |   |         |      | 16/113.1   |
| 5,636,410 | A | * | 6/1997  | Chou | A45C 13/262 |
|           |   |   |         |      | 16/113.1   |

(Continued)

FOREIGN PATENT DOCUMENTS

| JP | 3122215 U    | 6/2006 |
|----|--------------|--------|
| JP | 2012065977 A | 4/2012 |

(Continued)

OTHER PUBLICATIONS

Notice of Reasons for Refusal for JP app. No. 2016-230289, dated Oct. 18, 2019, with English translation from Global Dossier.

(Continued)

*Primary Examiner* — Victor D Batson
*Assistant Examiner* — Matthew J Sullivan
(74) *Attorney, Agent, or Firm* — Ladas & Parry, LLP

(57) ABSTRACT

When a user pushes an operating member to one side in a longitudinal direction of arms, holding of a holding member is released and the arms can be expanded and contracted, while when the user pushes the operating member to the other side in the longitudinal direction of the arms, locking of a locked body by an engaging and disengaging member is released, and a handle body can be pivoted around a pivoting center shaft with respect to a carry case body.

3 Claims, 23 Drawing Sheets

(56) References Cited

U.S. PATENT DOCUMENTS

| | | | | |
|---|---|---|---|---|
| 5,864,921 | A * | 2/1999 | Chou | A45C 13/262 16/405 |
| 6,409,207 | B1 * | 6/2002 | Kuo | A45C 13/262 280/655.1 |
| 6,619,448 | B1 * | 9/2003 | Wang | A45C 13/262 190/115 |
| 6,679,360 | B2 * | 1/2004 | Wang | A45C 13/262 16/113.1 |
| 6,827,186 | B1 * | 12/2004 | Hsie | A45C 13/262 16/113.1 |
| 7,188,715 | B1 | 3/2007 | Chen | |
| 7,380,647 | B2 * | 6/2008 | Liang | A45C 13/262 16/113.1 |
| 8,214,972 | B2 * | 7/2012 | Lai | A45C 13/262 16/113.1 |
| 9,408,449 | B1 * | 8/2016 | Tsai | A45C 13/262 |
| 9,764,751 | B2 * | 9/2017 | Cho | A45C 5/04 |
| 9,872,547 | B2 * | 1/2018 | Naiva | A45C 13/262 |
| 2002/0095746 | A1 * | 7/2002 | Wang | A45C 13/262 16/405 |
| 2003/0038007 | A1 * | 2/2003 | Han | A45C 13/262 190/115 |
| 2009/0266833 | A1 | 10/2009 | Savage et al. | |
| 2012/0205510 | A1 * | 8/2012 | Fortier | A45C 13/262 248/423 |
| 2017/0310151 | A1 * | 10/2017 | Curescu | H02J 7/0042 |

FOREIGN PATENT DOCUMENTS

| | | |
|---|---|---|
| JP | 2012065978 A | 4/2012 |
| TW | 427128 | 3/2001 |
| TW | 201524410 A | 7/2015 |
| WO | 2016073902 A1 | 5/2016 |

OTHER PUBLICATIONS

Notice of Reasons for Refusal for JP app. No. 2016-230296, dated Oct. 18, 2019, with English translation from Global Dossier.

Office Action from TW app. No. 105136460, dated Oct. 24, 2019, with machine English translation from Google Translate.

* cited by examiner

OPERATING HANDLE DEVICE

CROSS-REFERENCE TO RELATED APPLICATIONS

This application is a continuation application of U.S. patent application Ser. No. 15/347,754 filed on Nov. 9, 2016, which claims priority to Japanese Patent Application No. 2016-101725 filed on May 20, 2016, the disclosures of which are incorporated herein by reference in their entireties.

BACKGROUND OF THE INVENTION

Field of the Invention

The present invention relates to an operating handle device attached to a carry case and the like for accommodating and carrying belongings such as clothes in a travel and the like, for example.

Background Art

This type of operating handle device is proposed in Japanese Patent Laid-Open No. 2005-137902. In Japanese Patent Laid-Open No. 2005-137902, such configuration is cited that an operating handle device called a towing handle system is attached to a carry case body and used for towing thereof. The operating handle device described in Japanese Patent Laid-Open No. 2005-137902 includes arms (in this case, they are called "posts") attached in a pair to the carry case body and a handle assembly pivotably attached to distal ends of the arms.

In the operating handle device described in Japanese Patent Laid-Open No. 2005-137902, it is configured such that locking and unlocking of expansion and contraction of the arms with respect to the carry case body and locking and unlocking of pivoting movement of the handle assembly with respect to the arms can be performed by an operating member (in this case, it is called a "push-button") provided on the handle assembly.

In the operating handle device described in Japanese Patent Laid-Open No. 2005-137902, the handle assembly is attached to the distal ends of the arms, and locking and unlocking of the pivoting movement of the handle assembly is configured capable of being performed by an operation of the operating member. In other words, this operating handle device is configured such that the arm cannot be pivoted but only the handle assembly is pivoted at the distal ends of the arms.

SUMMARY OF THE INVENTION

Thus, the present invention has an object to provide an operating handle device which can lock and unlock expansion and contraction of the arms and can lock and unlock pivoting movement of the arms by the operation of the operating member.

In order to promote basic understanding of some features of the present invention, a brief outline of the present invention will be described below. This outline does not indicate an outline on extension of the present invention. This is not intended to specify major or important elements of the present invention or to limit a range of the invention. Its purpose is only to present some basic concepts of the invention in a brief form as a premise of more detailed explanation which will be described later.

An operating handle device of the present invention includes:

an arm having an outer arm member and an inner arm member movable along a longitudinal direction of the outer arm member so as to be capable of being accommodated in the outer arm member, in which a pivoting mechanism is provided on the arm, and one end side in the longitudinal direction of the arm is attached to a mounted body, capable of pivoting movement through the pivoting mechanism;

an operated rod provided along the longitudinal direction of the arm and movable along the longitudinal direction of the arm together with the inner arm member;

a holding member attached to the inner arm member so as to be movable between a protruding position protruding to an outer side of the arm from an inner side of the arm and a retreated position retreated to the inner side of the arm and holding at least two modes that include a longest expanded mode of the arm in which the inner arm member protrudes to the maximum in the longitudinal direction of the arm with respect to the outer arm member by being located at the protruding position so as to be engaged with the outer arm member and a shortest contracted mode of the arm in which the inner arm member is accommodated to the maximum in the longitudinal direction of the arm with respect to the outer arm member;

a holding spring body for urging the holding member at the protruding position where the holding member protrudes to the outer arm member side and is locked by the outer arm member;

an engaging and disengaging member capable of being engaged with and disengaged from the pivoting mechanism;

a locking spring body for urging the engaging and disengaging member in a direction which becomes a contact position where the engaging and disengaging member is brought into contact with the pivoting mechanism and the engaging and disengaging member holds the pivoting mechanism non-rotationally;

an operating member connected to the operated rod, capable of a moving operation of the operated rod in one direction and the other direction along the longitudinal direction of the arm for a distance corresponding to a distance between the retreated position and the protruding position of the holding member and a distance corresponding to a distance between the contact position of the engaging and disengaging member and a separated position where the engaging and disengaging member is separated from the pivoting mechanism; and a linkage device for moving both the operated rod and the engaging and disengaging member by linking the operated rod and the engaging and disengaging member to each other so as to change the engaging and disengaging member at the contact position to the separated position when the moving operation for moving the operating member in the other direction for a certain distance is performed.

In the operating handle device of the present invention, such configuration can be employed that the arms are provided in parallel as a pair at an interval, the other end sides in the longitudinal direction of the both arms are connected by a gripping handle, and the operating member is provided on the gripping handle.

In the operating handle device of the present invention, such configuration can be employed that the operating member is configured switchable among a holding release position where it has been moved in one direction along the longitudinal direction of the arms, an unlocking position where it has been moved in the other direction along the longitudinal direction of the arms, and a reference position between the holding release position and the unlocking position, in which the holding release position of the operating member corresponds to the retreated position of the holding member, the unlocking position of the operating member corresponds to the separated position of the engaging and disengaging member, and the reference position of the operating member corresponds to the protruding position of the holding member and the contact position of the engaging and disengaging member.

In the operating handle device of the present invention, such configuration can be employed that the operating members are provided in a pair on one side and the other side of the gripping handle.

In the operating handle device of the present invention, such configuration can be employed that the pivoting mechanism includes a pivoting center shaft which is a pivoting center of the arms, a locked body which includes a locked groove in which the engaging and disengaging member can be locked in an outer peripheral portion and is rotatable around a support shaft arranged in parallel with the pivoting center shaft, and a gear group dynamically connecting the pivoting center shaft and the support shaft.

BRIEF DESCRIPTION OF THE DRAWINGS

The aforementioned features and the other features of the present invention will be made apparent by explanation and drawings on embodiments illustrated on the present invention.

DETAILED DESCRIPTION OF THE PREFERRED EMBODIMENT

Figure 1A:
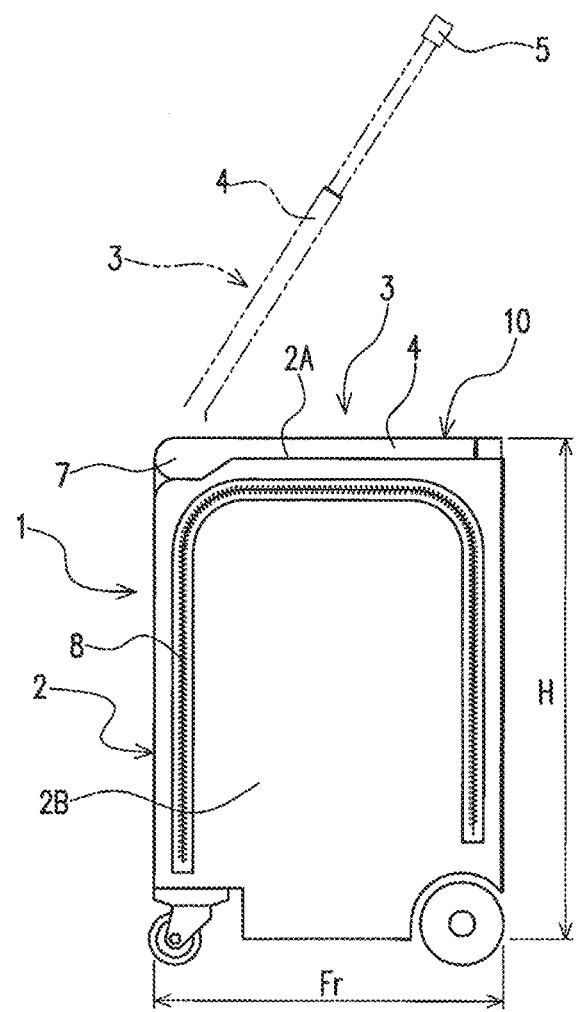
FIG. 1A is an explanatory view when an operating handle device according to an embodiment of the present invention is attached to a carry case body and illustrates an entire side view.
Figure 1B:
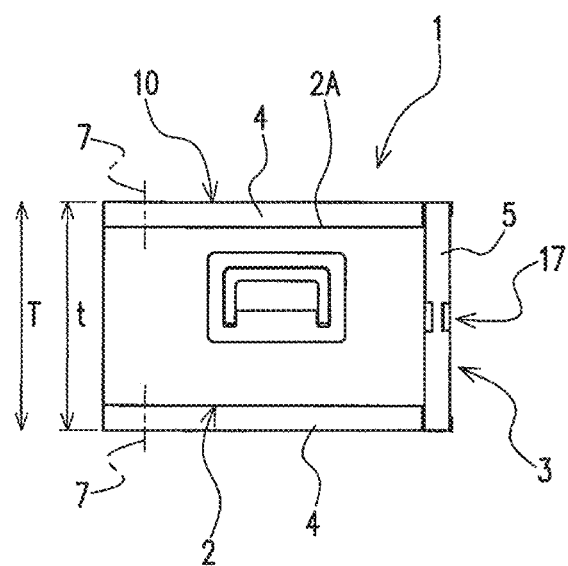
FIG. 1B is an explanatory view when the operating handle device according to the embodiment of the present invention is attached to the carry case body and illustrates an entire plan view.
Figure 1C:
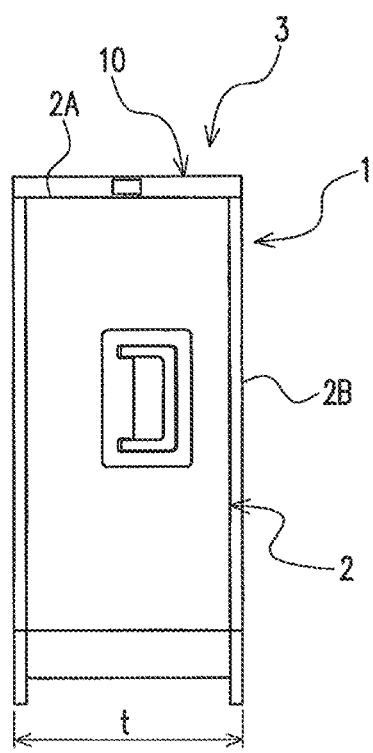
FIG. 1C is an explanatory view when the operating handle device according to the embodiment of the present invention is attached to the carry case body and illustrates an entire front view.

Hereinafter, an operating handle device according to an embodiment of the present invention will be described by referring to the attached drawings by citing an example attached to a carry case body which is a mounted body. As illustrated in FIGS. 1A to 1C, the carry case 1 includes a carry case body 2 and an operating handle device 3. The carry case body 2 is formed having a cuboid shape with a thickness smaller than a vertical height H and a longitudinal width Fr. An inside of the carry case body 2 is an accommodating space for accommodating clothes and the like, and casters (reference numerals thereof are omitted) are attached to front, rear, right, and left corners on a lower part of the carry case body 2.

As illustrated in FIG. 1B, the operating handle device 3 is formed having a gate shape in which one side of a generally rectangular frame shape is open. As illustrated in FIG. 1B, one end sides in a longitudinal direction of arms 4 and 4 of the operating handle device 3 are attached to ends in a thickness direction T of the carry case body 2, respectively. The other end sides in the longitudinal direction of the both arms 4 and 4 are connected to each other by a gripping handle 5. As illustrated in FIG. 1A, each of the arms 4 and 4 is capable of being expanded and contracted in their longitudinal direction and is capable of pivoting movement with respect to the carry case body 2 through a pivoting mechanism 6. Each end in the thickness direction T of the carry case body 2 is located on an upper part and in a rear part of the carry case body 2 in this case.

In these corner parts on the upper part and in the rear part, a pivoting center shaft 7 provided in the pivoting mechanism 6 (see FIG. 2, for example) is inserted and supported in the thickness direction T of the carry case body 2. The pivoting center shaft 7 is inserted into the carry case body 2 in this case not over the whole region in the thickness direction T of the carry case body 2 but is only inserted through a side wall, for example.

On the carry case body 2, a recess portion 2A in which the both arms 4 and 4 and the gripping handle 5 are accommodated when the operating handle device 3 is fallen around the pivoting center shaft 7 is formed on the upper part. In the carry case body 2, a slide fastener 8 for opening an accommodating space inside is provided by sewing on either one of facing right and left side surfaces or on each of both side surfaces 2B.

Figure 2A:
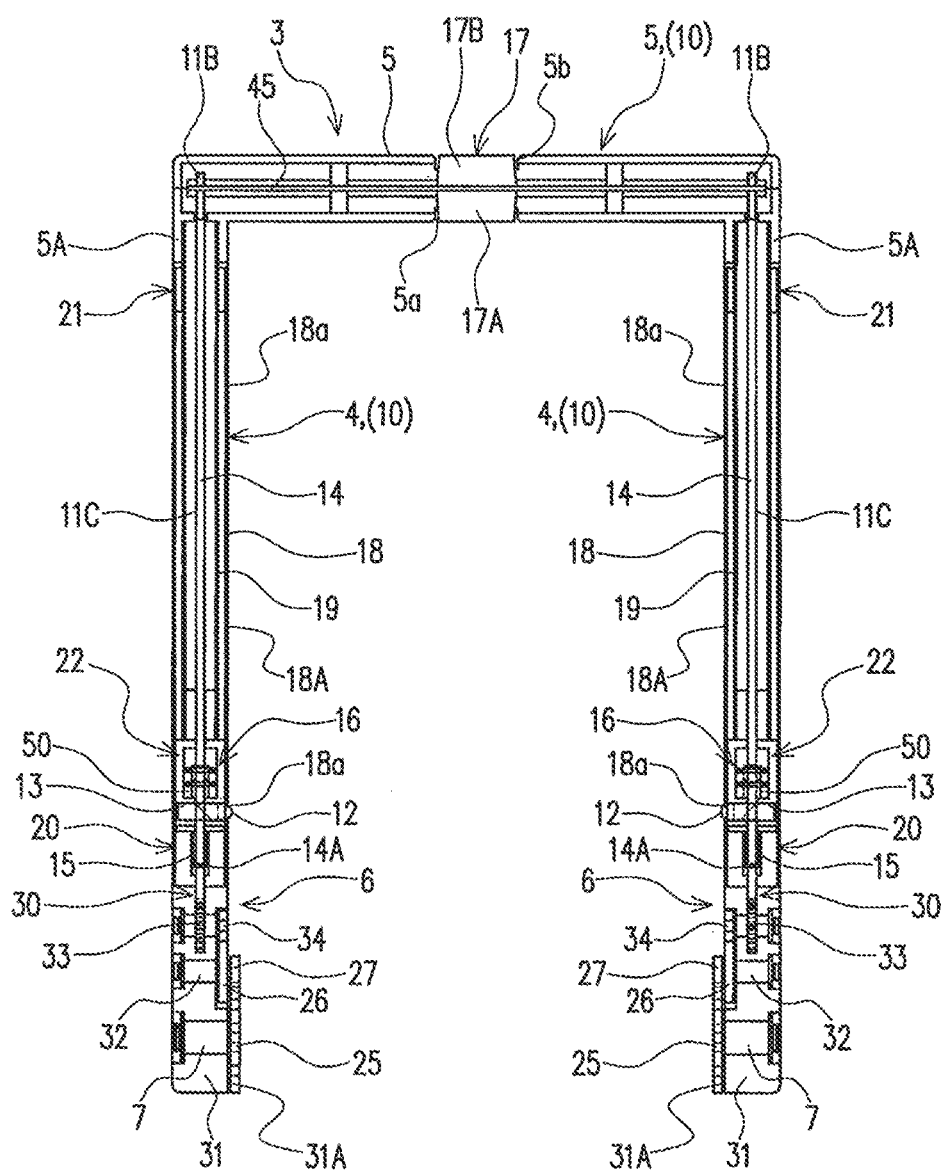
FIG. 2A is an entire view of an internal structure of the operating handle device and is an entire front view illustrating a shortest contracted mode of arms.
Figure 2B:
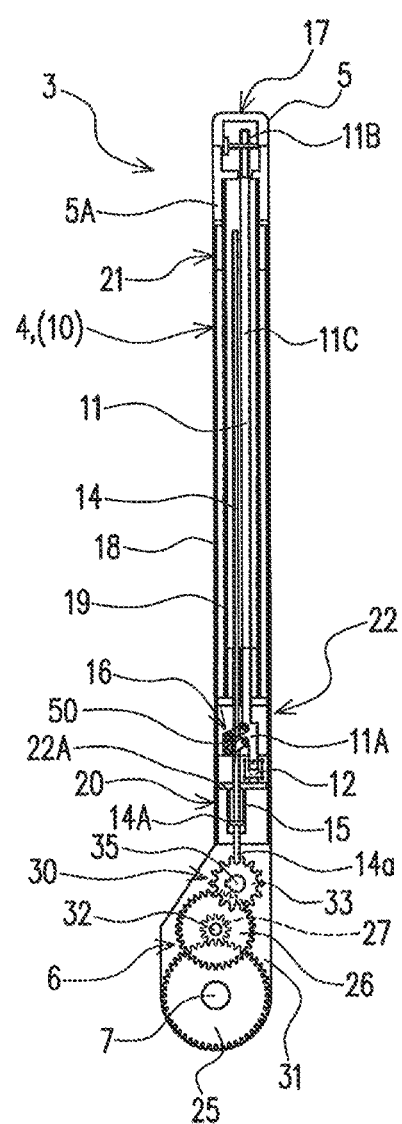
FIG. 2B is an entire view of the internal structure of the operating handle device and is an entire side view illustrating a shortest contracted mode of the arms.
Figure 3:
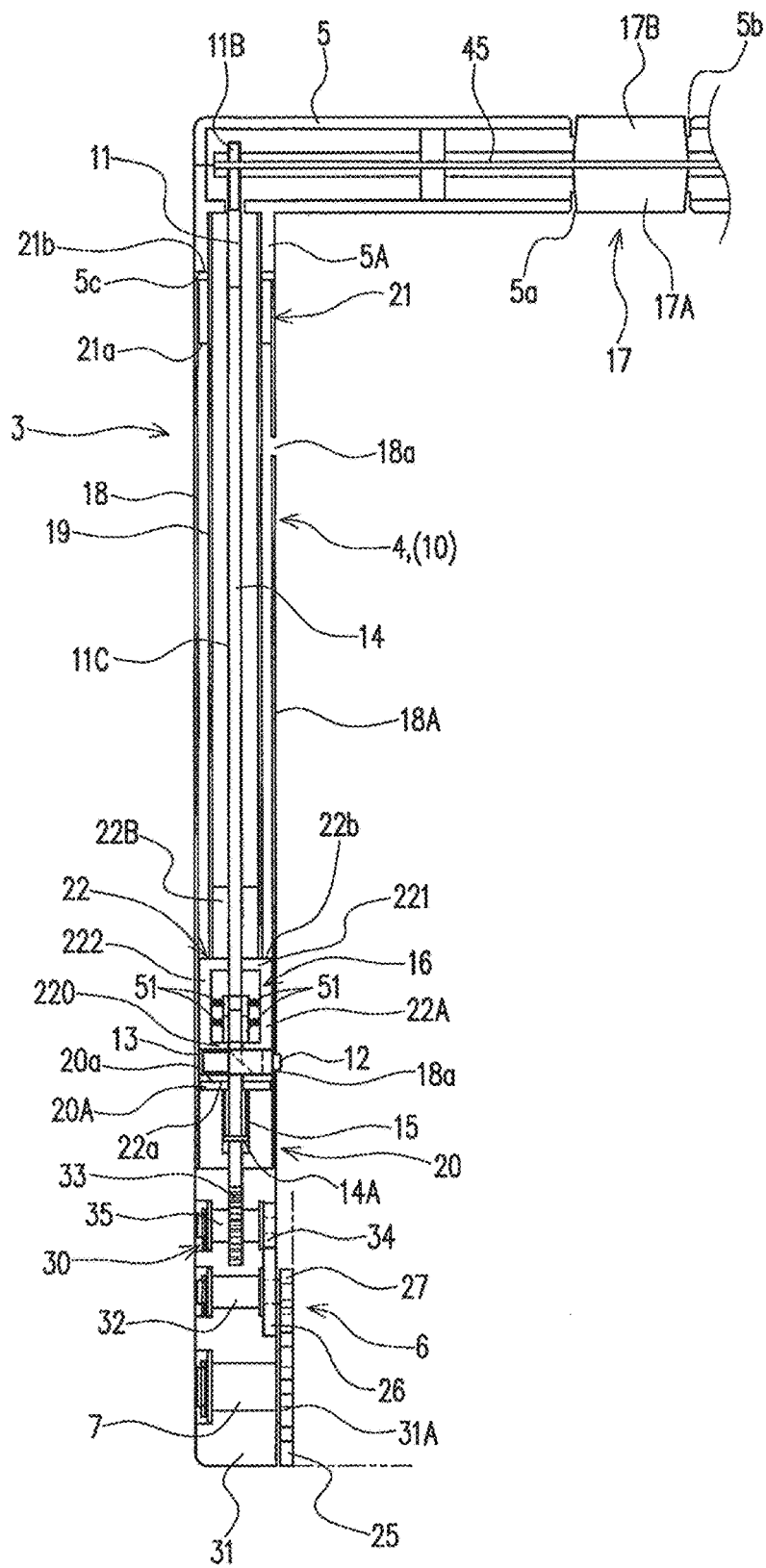
FIG. 3 is an enlarged front view illustrating a part of the internal structure of the operating handle device and illustrates the shortest contracted mode of the arms.
Figure 4:
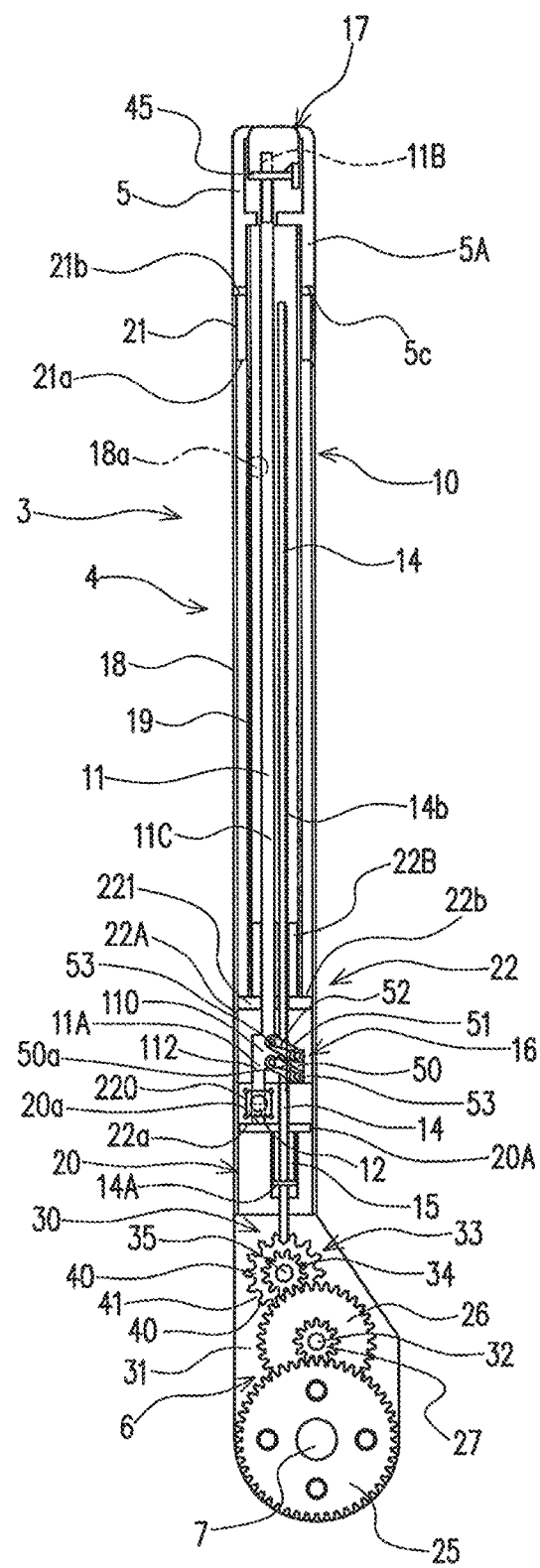
FIG. 4 is an enlarged side view of the same and illustrates the shortest contracted mode of the arms.

As illustrated in FIGS. 2 to 4, the operating handle device 3 includes a handle body 10, the pivoting mechanisms 6, operated rods 11, holding members 12, holding spring bodies 13, engaging and disengaging members 14, locking spring bodies 15, a linkage device 16, and operating members 17. The pivoting mechanisms 6, the operated rods 11, the holding members 12, the holding spring bodies 13, the engaging and disengaging members 14, the locking spring bodies 15, the linkage device 16, and the operating members 17 are provided in pairs, respectively.

As illustrated in FIGS. 2A and 2B, the handle body 10 includes a pair of the arms 4 and 4 and the gripping handle 5. One end sides in the longitudinal direction of these arms 4 and 4 (on proximal end sides in the longitudinal direction and on the pivoting mechanism 6 sides) are attached to the carry case body 2 capable of pivoting movement through the pivoting mechanisms 6. The arms 4 and 4 are arranged in parallel with each other. Each of these arms 4 and 4 has an outer arm member 18 and an inner arm member 19 movable in the longitudinal direction of the outer arm member 18. The inner arm member 19 is configured movable along the longitudinal direction of the outer arm member 18 so as to be capable of being accommodated in the outer arm member 18. Configuration of each of the arms 4 and 4 is the same, and thus, the arm 4 on one side and the configuration provided in the arm 4 on the one side will be described in the following explanation.

As illustrated in FIG. 3, the outer arm member 18 and the inner arm member 19 are both formed each having a square cylindrical shape (a pipe shape) and also having a rod shape. A sectional area in a direction orthogonal to the longitudinal direction of the inner arm member 19 is set smaller than the sectional area in the direction orthogonal to the longitudinal direction of the outer arm member 18.

Figure 5:
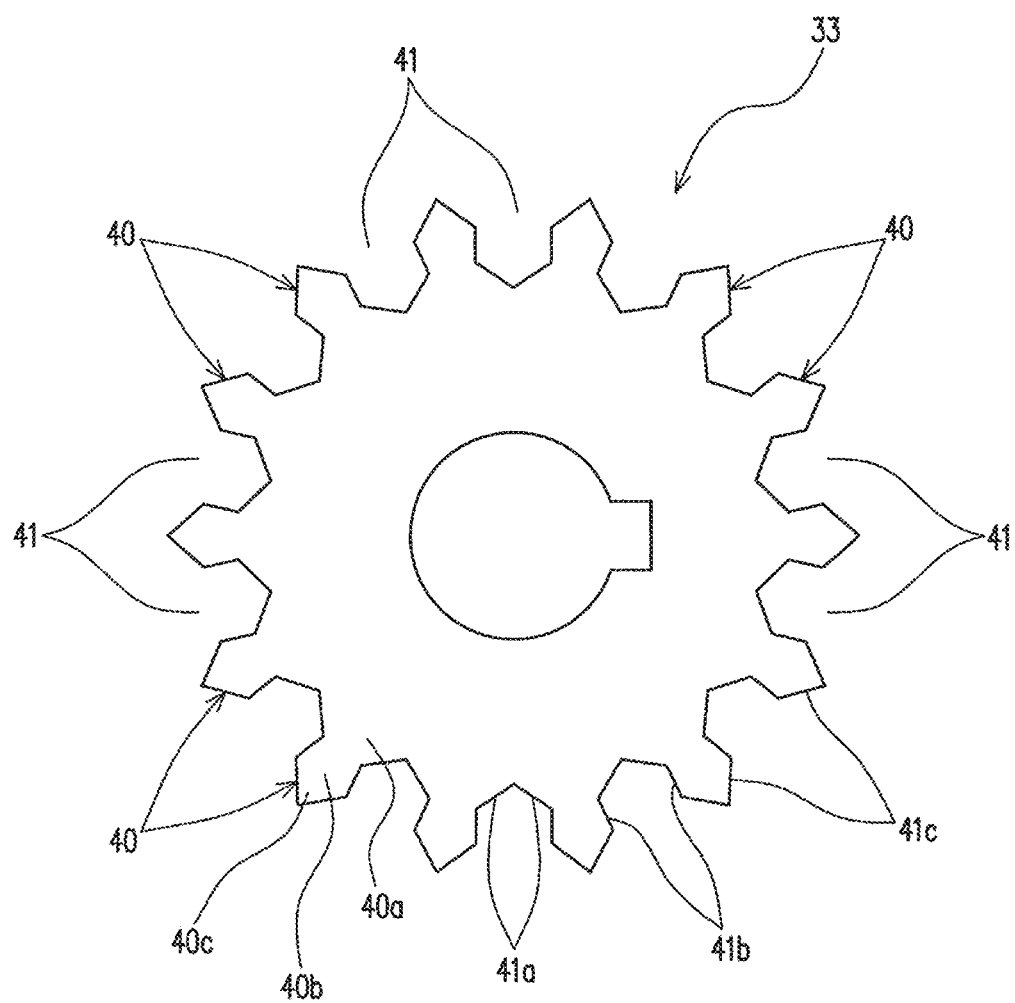
FIG. 5 is an enlarged view of a locked body.
Figure 6:
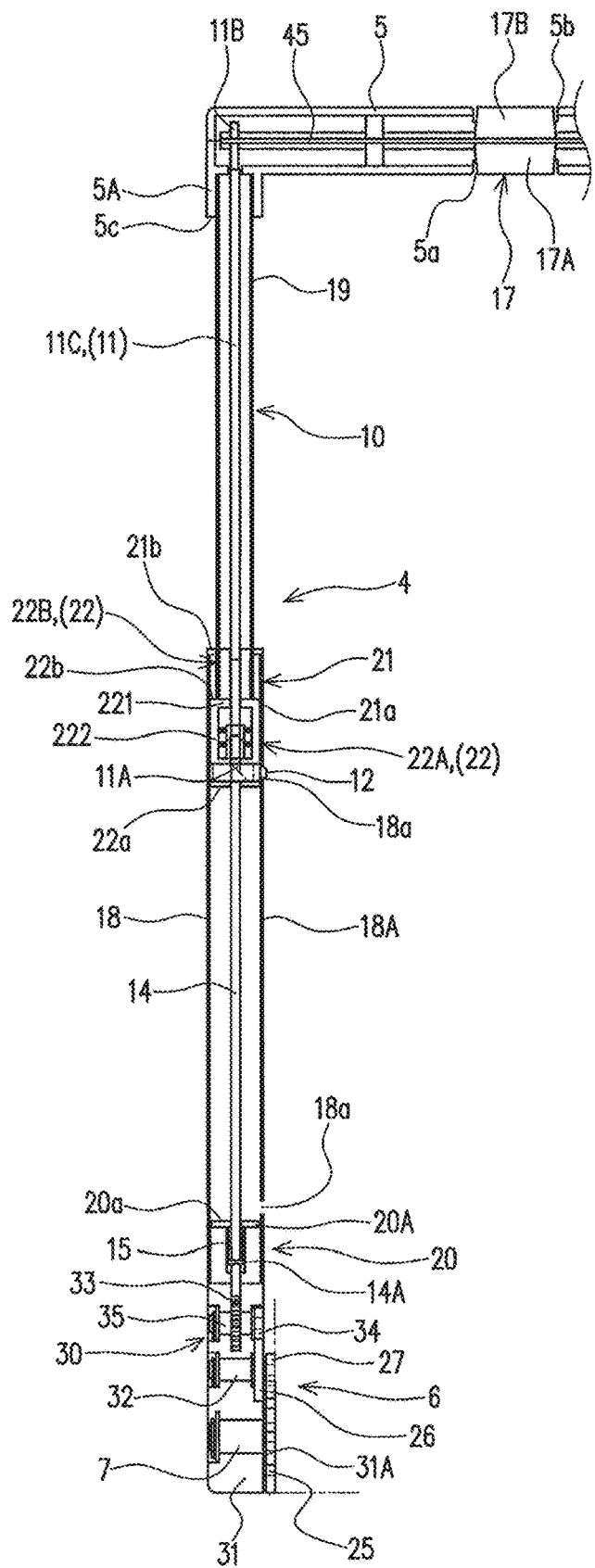
FIG. 6 illustrates a part of the internal structure of the operating handle device and illustrates a longest expanded mode of the arms.
Figure 7:
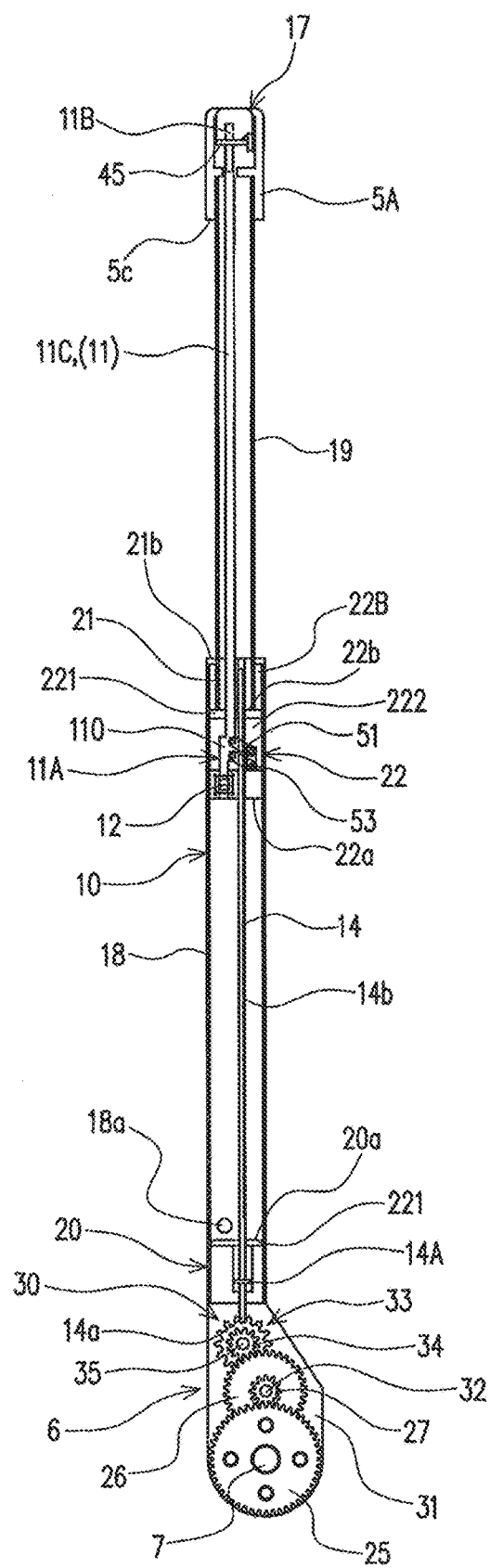
FIG. 7 is a side view of the same and illustrates the longest expanded mode of the arms.

As illustrated in FIGS. 3 to 7, the arms 4 are configured switchable between a shortest contracted mode and a longest expanded mode. The shortest contracted mode is, as illustrated in FIGS. 3 and 4, a state where the arms 4 are contracted to the maximum. Specifically, the shortest contracted mode is a state where the inner arm members 19 are accommodated to the maximum in a state concentric to the outer arm members 18. The longest expanded mode is, as illustrated in FIGS. 6 and 7, a state where the arms 4 are expanded to the maximum. Specifically, the longest expanded state is a state where the inner arm members 19 are protruded to the maximum in the longitudinal direction with respect to the outer arm members in a state concentric to the outer arm members 18. Positions of the inner arm member 19 in the shortest contracted mode and the longest expanded mode are determined by a regulating device.

In each of facing surfaces 18A of the outer arm members 18 in the outer arm members 18, locking holes 18a through which the holding member 12 can advance and retreat are formed. The locking holes 18a are formed at plural places (in this case, three places or more) separated at a predetermined interval in the longitudinal direction of the outer arm member 18. The locking holes 18a are arranged on the same straight line along the longitudinal direction.

The outer arm member 18 and the inner arm member 19 include the regulating device for regulating a moving amount of the inner arm member 19 so that the arm 4 is set to the shortest contracted mode and to the longest expanded mode. The regulating device includes a one-end side stopper 20 fixed to the one end side on an inner side of the outer arm member 18, the other end side stopper 21 provided on the other end side on the inner side of the outer arm member 18, and an inner stopper 22 fixed to the one end side of the inner arm member 19.

The one-end side stopper 20 is formed having a cuboid shape and includes a one-end receiving surface 20a capable of receiving the one end side of the inner stopper 22. The other end side stopper 21 includes the other end receiving surface 21a for receiving the inner stopper 22. The inner stopper 22 includes a one-end side contact surface 22a capable of receiving so as to be in contact with the one-end receiving surface 20a and the other-end side contact surface 22b capable of receiving so as to be brought into contact with the other end receiving surface 21a. The one-end side contact surface 22a and the other end side contact surface 22b are planes. In the regulating device, the other end side stopper 21 is a flange-shaped member made by reducing a diameter of the other end side of the outer arm member 18. One-end side surface of this flange-shaped member is the other end receiving surface 21a.

The pivoting mechanism 6 is a gear mechanism including a speed reduction function. The pivoting mechanism 6 includes a large-diameter spur gear 25, a medium-diameter spur gear 26, and a small-diameter spur gear 27 configuring a gear group composed of a plurality of gears. The pivoting mechanism 6 further includes an engaged and disengaged device 30, and the pivoting mechanism 6 is arranged on and supported by a support body 31 formed on a solid section.

The large-diameter spur gear 25 is arranged closer to a one end side of the support body 31 and is made rotatable around the pivoting center shaft 7 which is to be a pivoting center of the arm 4. The longitudinal direction of the pivoting center shaft 7 follows the thickness direction T of the carry case body 2. The pivoting center shaft 7 penetrates the support body 31 and is rotatably supported by the support body 31. The large-diameter spur gear 25 is configured so as to rotate integrally with the pivoting center shaft 7. The small-diameter spur gear 27 is arranged in the same plane as the large-diameter spur gear 25. The small-diameter spur gear 27 is configured so as to rotate integrally with a relay shaft 32 around the relay shaft 32 as a rotation center in parallel with the pivoting center shaft 7 and arranged closer to the other end side of the support body 31 with respect to the pivoting center shaft 7. The relay shaft 32 penetrates the support body 31 and is rotatably supported by the support body 31. The medium-diameter spur gear 26 is configured so as to rotate integrally with the relay shaft 32. That is, the small-diameter spur gear 27 and the medium-diameter spur gear 26 are arranged concentrically. The medium-diameter spur gear 26 is arranged closer to a center of the support body 31 in the thickness direction T with respect to the small-diameter spur gear 27.

The engaged and disengaged device 30 includes a function of allowing rotation of the gear group by allowing rotation and a function of preventing the rotation of the gear group by preventing the rotation. The engaged and disengaged device 30 has its rotation prevented by locking of the engaging and disengaging member 14 which will be described later and has its rotation allowed by separation of the engaging and disengaging member 14.

The engaged and disengaged device 30 includes a locked body 33, a regulating spur gear 34, and a regulating shaft 35. The locked body 33 and the regulating spur gear 34 are configured rotatable with the regulating shaft 35. The regulating shaft 35 is a support shaft arranged in parallel with the pivoting center shaft 7 and the relay shaft 32. The regulating shaft 35 penetrates the support body 31 and is rotatably supported by the support body 31. The regulating shaft 35 is in parallel with the pivoting center shaft 7. The locked body 33, the regulating spur gear 34, and the regulating shaft 35 are arranged concentrically. The regulating spur gear 34 is arranged on the same plane as the medium-diameter spur gear 26 and is meshed with the medium-diameter spur gear 26. The large-diameter spur gear 25 and the small-diameter spur gear 27 are arranged at positions protruding inward in a width direction from the facing surface 18A of the outer arm member 18. The medium-diameter spur gear 26 and the regulating spur gear 34 are arranged flush with a facing surface 31A of the support body 31.

The locked body 33 is internally fitted in the support body 31 and is arranged substantially at a center in its thickness direction T. As illustrated in FIG. 5, the locked body 33 is formed having a disk shape similar to a general spur gear. On an outer peripheral surface of the locked body 33, a plurality of locked projections 40 are formed in a peripheral direction at equal intervals. A space between the locked projections 40 adjacent in the peripheral direction is a locked groove 41 causing a distal end portion 14a of the engaging and disengaging member 14 which will be described later to be locked. At a center part of the locked body 33, a center hole fitted with the regulating shaft 35 and a key way formed continuous to the center hole are formed. Reference numerals of the center hole and the key way are omitted.

Configuration of the locked body 33 different from a general spur gear is, as illustrated in FIG. 5, a shape of each of the locked projections 40 and a shape of each of the locked grooves 41. Since the shape of the locked projection 40 and the shape of the locked groove 41 correspond to each other, the shape of the locked groove 41 will be mainly described for convenience. One locked groove 41 is formed of radial inner side surfaces 41a and 41a, radial middle side surfaces 41b and 41b, and radial outer side surfaces 41c and 41c. The radial inner side surfaces 41a and 41a, the radial middle side surfaces 41b and 41b, and the radial outer side surfaces 41c and 41c are all planes along the regulating shaft 35.

The radial inner side surfaces 41a and 41a are formed with inclination so as to be narrowed on center sides in the radial direction at a dull angle. The radial middle side surfaces 41b and 41b are formed so that their outer sides in the radial direction slightly get closer to each other up to middle portions in the radial direction. The radial outer side surfaces 41c and 41c are inclined so that the outer sides in the radial direction are more separated from each other. If the locked projections 40 are made to correspond to them, a radial inner side portion 40a is formed having a flared shape, a radial middle portion 40b is formed having a constricted shape, and a radial outer portion 40c is formed having a pointed end shape in each of the locked projections 40.

By providing such locked projections 40, the distal end portion 14a of the engaging and disengaging member 14 can be easily inserted into the locked groove 41 between the locked projections 40 and 40 adjacent in the peripheral direction. Moreover, when the distal end portion 14a of the engaging and disengaging member 14 is inserted into one of the locked grooves 41, it is reliably locked by the radial middle portion 40b having the constricted shape.

In the regulating device, the inner stopper 22 includes the other end side inner stopper portion 22B formed having a cuboid shape and a one-end side stopper portion 22A formed having a cuboid shape larger than the other end side inner stopper portion 22B. The one-end side inner stopper portion 22A includes a bottom wall 220, a top wall 221, and side walls 222 and 222 having the bottom wall 220 and the top wall 221 to continue to each other on both sides in the thickness direction T. Each of the bottom wall 220, the top wall 221, and the side walls 222 and 222 is formed having a flat plate shape.

The other end side inner stopper portion 22B is integrally provided on the top wall 221 of the one-end side inner stopper portion 22A. The one-end side contact surface 22a of the inner stopper 22 is a plane facing the one-end receiving surface 20a of the one-end side stopper 20 on the bottom wall 220 of the one-end side inner stopper portion 22A. The other end side contact surface 22b of the inner stopper 22 is a plane facing the other end receiving surface 21a of the other end side stopper 21 in the longitudinal direction of the arm 4 in the one-end side inner stopper portion 22A.

In the regulating device, the one-end receiving surface 20a in the one-end side stopper 20 is the other surface in the longitudinal direction on the top wall 20A of the one-end side stopper 20.

As illustrated in FIGS. 6 and 7, the operated rod 11 extends in the longitudinal direction of the arm 4 and includes a pressing portion 11A on its one end side. The operated rod 11 includes a held portion 11B on the other end, inserted through a bridging member 45 which will be described later. The operated rod 11 is formed longer than a length of the inner arm member 19. A body portion 11C which is a region other than the pressing portion 11A of the operated rod 11 is formed so as to have the same section from the one end to the other end. The body portion 11C has a section orthogonal to the longitudinal direction formed with a rectangular shape. The body portion 11C is inserted into the top wall 221 of the one-end side inner stopper portion 22A, and the pressing portion 11A is arranged in the inner stopper 22. The operated rod 11 is inserted into the top wall 221 of the one-end side inner stopper portion 22A and is inserted into the other end side stopper 21 so as to be made movable only in the longitudinal direction.

The pressing portion 11A is a portion for pressing and operating the holding member 12. As illustrated in FIGS. 4 and 7, the pressing portion 11A includes a width enlarged portion 110 extended from the body portion 11C and whose width is enlarged in a longitudinal direction orthogonal to the thickness direction T. The pressing portion 11A includes a pressing distal end portion 112 further extended from the width enlarged portion 110 toward the one end side to directly press the holding member 12. The pressing distal end portion 112 is extended in the longitudinal direction at a position shifted in the longitudinal direction from the width enlarged portion 110. A farthest distal end of the pressing distal end portion 112 is formed having an inclined surface. The held portion 11B is an extension portion of the body portion 11C and is a portion further protruding from the other end side of the inner arm member 19 and reaching an inside of the gripping handle 5 which will be described later.

The holding member 12 is attached to the inner arm member 19 so as to be movable between a protruding position protruding from the inside of the arm 4 to an outside of the arm 4 and a retreated position retreated to the inside the arm 4. As illustrated in FIG. 3, the holding member 12 protrudes outward from inside the arm 4 and can be engaged with the facing wall of the outer arm member 18. The holding member 12 is a member for holding either one of at least two modes that include the longest expanded mode of the arm 4 (see FIG. 6) and the shortest contracted mode of the arm 4 (see FIG. 3) by engaging the facing wall of the outer arm member 18.

Figure 8:
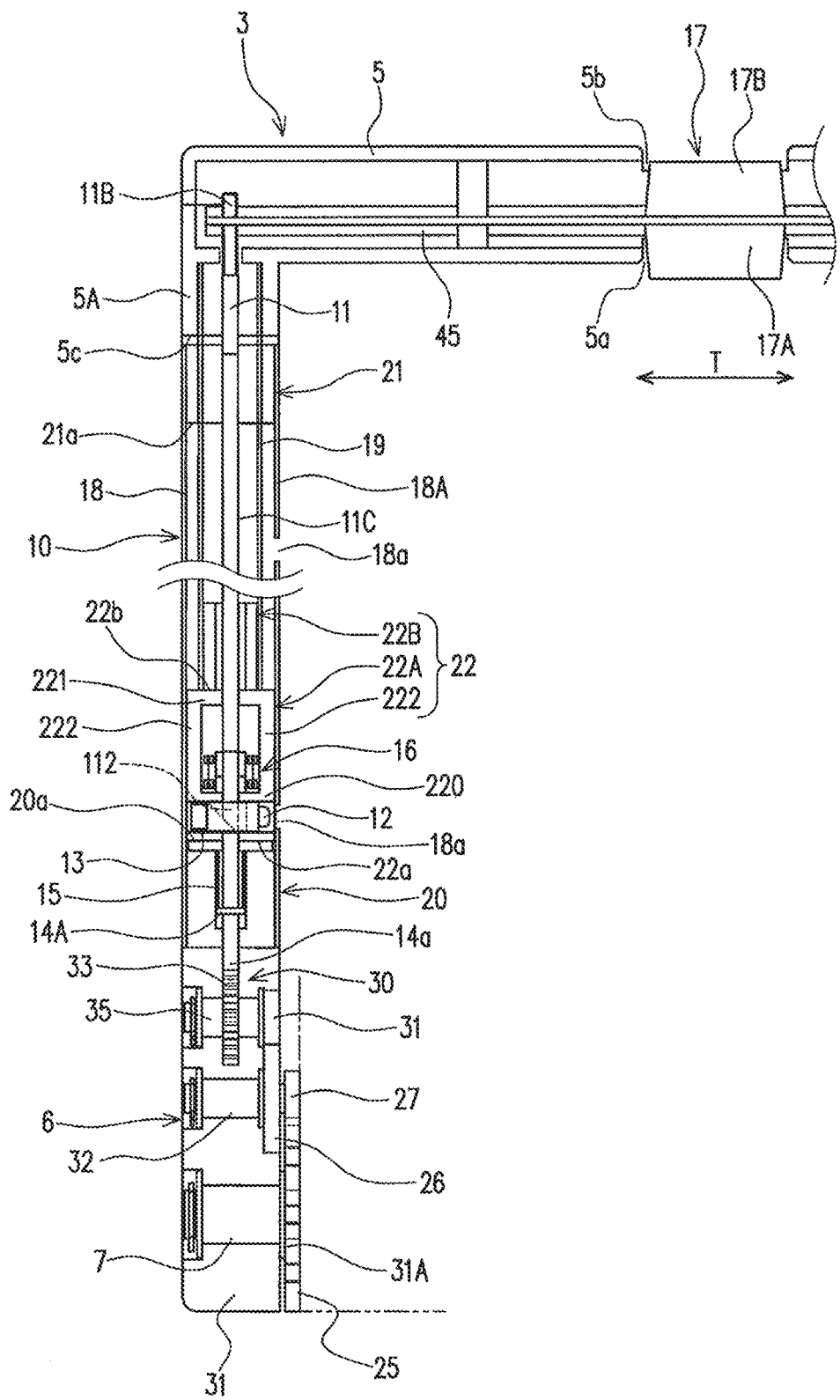
FIG. 8 is an enlarged front view illustrating a part of the internal structure of the operating handle device and illustrates the shortest contracted mode of the arms and also illustrates a holding release position of the operating member.

As illustrated in FIGS. 3 and 8, the holding member 12 is capable of entering into and retreating from the locking hole 18a. The holding member 12 is a pin body locked by the outer arm member 18 by protruding from the locking hole 18a. The holding member 12 is accommodated so as to be embedded in the bottom wall 220 of the one-end side inner stopper portion 22A with the thickness direction T as the longitudinal direction. The holding member 12 is made movable in the thickness direction T using the bottom wall 220 as a guide in a state embedded in the bottom wall 220. The holding member 12 is arranged with its longitudinal direction in parallel with the pivoting center shaft 7. In the bottom wall 220, the holding spring body 13 for urging the holding member 12 in the direction protruding from the locking hole 18a is accommodated. The holding spring body 13 is a coil spring.

Figure 9:
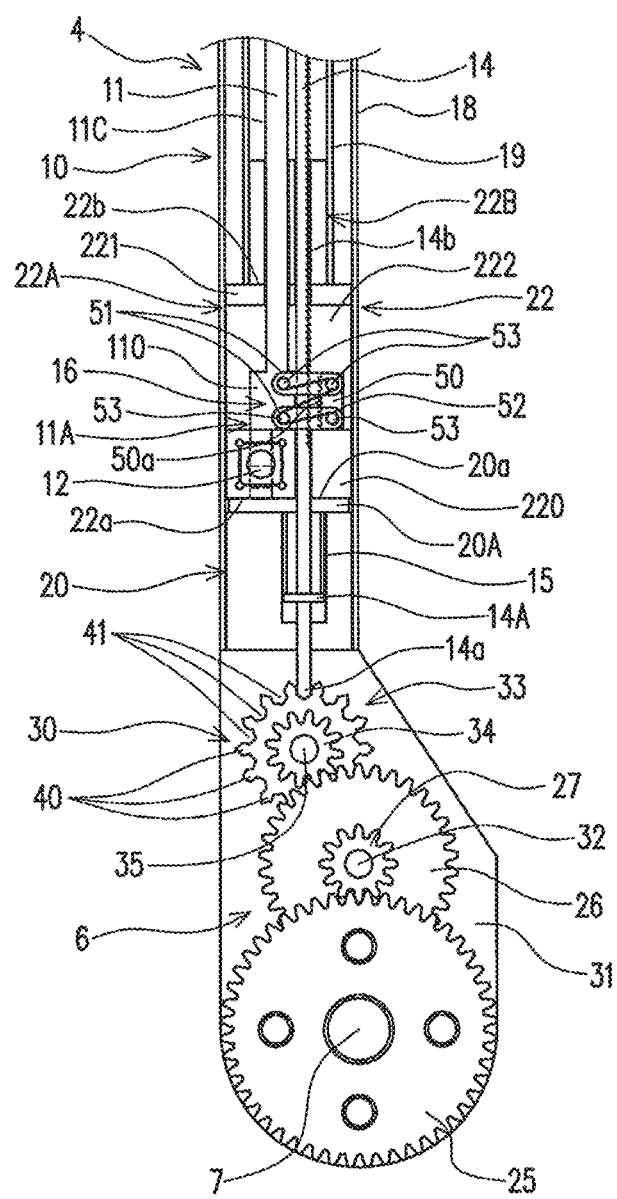
FIG. 9 is an explanatory view of configuration of a pivoting mechanism and a linkage device and illustrates a contact position where an engaging and disengaging member is locked by the locked body of the pivoting mechanism and also illustrates a state where a regulating body of the linkage device is separated from the engaging and disengaging member.

As illustrated in FIGS. 4, 7, and 9, the engaging and disengaging member 14 is formed having a rod shape along the longitudinal direction of the arm 4. A section at a predetermined position in the longitudinal direction of the engaging and disengaging member 14 is formed having a rectangular shape. The engaging and disengaging member 14 is internally fitted in the outer arm member 18. The one end side of the engaging and disengaging member 14 is movably inserted into the one-end side stopper 20 along the longitudinal direction of the arm 4. In the middle portion in the longitudinal direction of the engaging and disengaging member 14, the inner stopper 22 (one-end side inner stopper portion 22A and the other end side inner stopper portion 22B) is inserted movably in the longitudinal direction.

The distal end portion 14a of the engaging and disengaging member 14 is formed having a pointed end shape. The distal end portion 14a can be locked in either one of the locked grooves 41 (the locked projections 40) of the locked body 33. The engaging and disengaging member 14 includes a locking portion by which a regulating body 50 of the linkage device 16 which will be described later is locked. The locking portion is formed toward the other end side from the middle in the longitudinal direction of the engaging and disengaging member 14. Specifically, the locking portion is composed of a large number of locking teeth 14b formed in a serrated state.

Each of the locking teeth 14b is formed as a triangular recess portion. That is, the locking tooth 14b includes an inclined surface formed on an outer surface of the engaging and disengaging member 14 and a locking surface rising from an end of the inclined surface (reference numerals of the inclined surface and the locking surface are omitted). In the engaging and disengaging member 14, such locking teeth 14b are continuously formed so as to be adjacent with each other in the longitudinal direction of the engaging and disengaging member 14.

The engaging and disengaging member 14 is urged toward one side in the longitudinal direction which is a direction in which the distal end portion 14a is locked in the locked groove 41 of the locked body 33 by a locking spring body 15. The locking spring body 15 has a function of urging the engaging and disengaging member 14 toward the contact position so that the pivoting mechanism 6 is held non-rotationally by the engaging and disengaging member 14. The locking spring body 15 is a coil spring internally fitted in the one-end side stopper 20. The contact position is a position of the engaging and disengaging member 14 in a state where the distal end of the engaging and disengaging member 14 is locked in the locked groove 41 of the locked body 33. When the engaging and disengaging member 14 is at the contact position, the pivoting mechanism 6 is locked and is not operated.

The engaging and disengaging member 14 includes a spring seating ring 14A which serves as a spring seat on one side of the locking spring body 15 in the middle of its longitudinal direction. The spring seating ring 14A is fixed to the engaging and disengaging member 14. The spring seating ring 14A is internally fitted in the one-end side stopper 20. The spring seat facing the spring seat on the one side is a back surface to the top wall 20A of the one-end side stopper 20.

Figure 10:
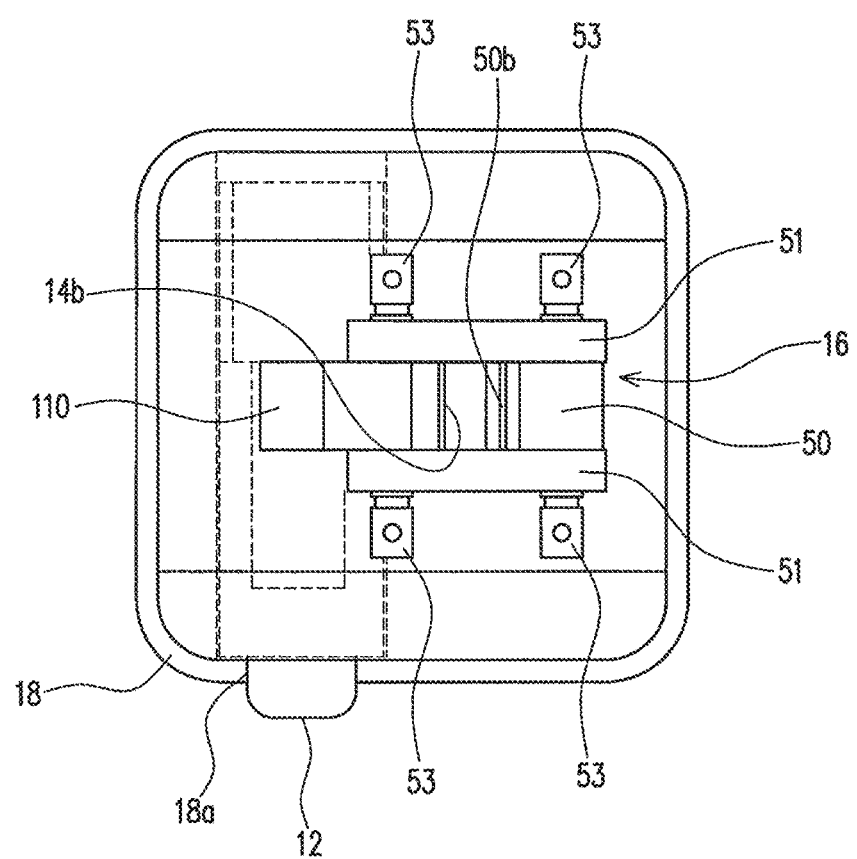
FIG. 10 is an explanatory view of configuration of the linkage device and is a plan sectional view in the outer arm member.

As illustrated in FIGS. 8, 9, and 10, the linkage device 16 includes a function of moving both the operated rod 11 and the engaging and disengaging member 14 to the other direction so as to move the engaging and disengaging member 14 at the contact position to the separated position by linking the operated rod 11 and the engaging and disengaging member 14 with a moving operation for moving the operating member 17 which will be described later in detail to the other direction by a predetermined distance. The separated position is a position of the engaging and disengaging member 14 in a state where the distal end of the engaging and disengaging member 14 is separated from the locked groove 41 of the locked body 33. By means of separation of the engaging and disengaging member 14 from the pivoting mechanism 6, the pivoting mechanism 6 is unlocked.

The linkage device 16 includes the regulating body 50, the connecting member 51, and an approaching spring 52. The regulating body 50 includes a locked tooth 50a capable of being engaged with and disengaged from the locking tooth 14b. The connecting member 51 connects the width enlarged portion 110 of the operated rod 11 and the regulating body 50 to each other. The approaching spring 52 urges the operated rod 11 toward the other side in the longitudinal direction and also urges it to the direction (the direction of causing the regulating body 50 to get closer to the locking tooth 14b) of locking the regulating body 50 by the locking tooth 14b.

The regulating body 50 is internally fitted in the inner stopper 22, is arranged on the side of the engaging and disengaging member 14 and is formed having a cuboid plate shape. In the regulating body 50, a predetermined number of the locked teeth 50a capable of being engaged with and disengaged from a predetermined number of the locking teeth 14b are formed on a surface facing the locking teeth 14b. The locked tooth 50a is formed having a triangular shape which is a shape corresponding to the locking tooth 14*b*. On the regulating body 50, such locked teeth 50*a* are continuously formed on the surface facing the locking teeth 14*b*.

The connecting member 51 is a link member. The connecting members 51 are provided in a pair on the one side in the longitudinal direction and on the other side in the longitudinal direction and provided in a pair in the thickness direction T. Each of the connecting members 51 is pivotably connected to the width enlarged portion 110 and the regulating body 50 through pins 53 inserted into each of an end portion on the width enlarged portion 110 side and an end portion of the regulating body 50 side.

The operating member 17 is connected to the operated rod 11 through the bridging member 45. The operating member 17 is a member moved and operated by a hand and finger of a user 55. The bridging member 45 is internally fitted in the gripping handle 5 movably to the one side in the longitudinal direction and to the other side in the longitudinal direction which is a direction orthogonal to a longitudinal direction of the gripping handle 5. The gripping handle 5 is formed having a square cylindrical shape (a pipe shape). On both sides in the longitudinal direction of the gripping handle 5, a connection portion 5A for connecting so as to fit the other side end portion in the longitudinal direction of the inner arm member 19 is formed integrally on the inner arm member 19.

The arm 4 on the one side and the configuration of the arm 4 on the one side have been described above. In the operating handle device 3, the arm 4 and the configuration of the arm 4 as above are included symmetrically in the thickness direction T.

The gate-shaped handle body 10 is formed by connecting the other end side of the inner arm member 19 to the connection portion 5A and by combining the gripping handle 5 and the arm 4. In the handle body 10, separation distances between the facing surfaces 18A and 18A of the outer arm members 18 and 18 are set slightly larger than a thickness t of the carry case body 2. The bridging member 45 is set to a length substantially equal to the gripping handle 5 along the longitudinal direction of the gripping handle 5.

The operating member 17 is attached to the gripping handle 5. The operating member 17 can move and operate the operated rod 11 along the longitudinal direction of the arm 4. The operating member 17 is connected to the operated rod 11 through the bridging member 45. The operating member 17 is provided so as to expose from attachment notches formed in one surface and the other surface on a center portion in the longitudinal direction (corresponding to the thickness direction T) of the gripping handle 5. One unit of the operating member 17 is provided by including a linkage device operating portion 17A and a holding release operating portion 17B.

The linkage device operating portion 17A is exposed to one attachment notch 5*a* formed in the one surface of the gripping handle 5. The holding release operating portion 17B is exposed to the other attachment notch 5*b* formed in the other surface of the gripping handle 5. Though details will be described later, by moving the linkage device operating portion 17A, the linkage device 16 is operated, while by moving the holding release operating portion 17B, the holding member 12 is operated.

The operating member 17 can move and operate the operated rod 11 in one direction and the other direction along the longitudinal direction of the arm 4 for a certain distance. The operating member 17 moves along the longitudinal direction by pushing the linkage device operating portion 17A or the holding release operating portion 17B. This predetermined distance is a distance corresponding to a distance between the retreated position of the holding member 12 in a state retreated (a going back position) inside the arm 4 and the protruding position of the holding member 12 in a state locked by the outer arm member 18. Moreover, this predetermined distance is a distance corresponding to a distance between the contact position of the engaging and disengaging member 14 and the separated position of the engaging and disengaging member 14.

In the carry case 1 with the configuration above, the operating handle device 3 is attached by inserting and supporting the pivoting center shaft 7 provided in the pivoting mechanism 6 in the thickness direction T of the carry case body 2. In the carry case 1, by opening the slide fastener 8, the clothes and the like can be accommodated in the internal space.

When the user 55 of the carry case 1 grips the gripping handle 5 of the operating handle device 3 and pushes the carry case body 2 forward and the casters rolls on a floor surface, for example, the user 55 can carry the carry case body 2.

In this carry case 1, the pivoting center shaft 7 provided in the pivoting mechanism 6 is inserted and supported in the thickness direction T at the corner parts on the upper part and in the rear part of the carry case body 2. That is, the carry case body 2 can be carried by pushing it forward which is a direction orthogonal to the thickness direction T. Since the carry case body 2 has a length in the longitudinal direction longer than the thickness t, the user 55 can carry the carry case body 2 in a stable posture by pushing.

The operating handle device 3 of this embodiment is configured such that expansion and contraction of the arm 4 can be locked and unlocked and pivoting movement of the handle body 10 (the arm 4) can be locked and unlocked by the operation of the operating member 17. When the user 55 carries the carry case body 2, the user 55 can change the length of the arms 4 or an inclination angle of the handle body 10 with respect to the carry case body 2 in accordance with a body build of the user 55 or ease of carrying. By changing the length of the arms 4 or by changing the inclination angle of the handle body 10 in accordance with the body build of the user 55 or the like, carrying is facilitated.

As illustrated in FIG. 3, when the arm 4 is in the shortest contracted mode and the operating member 17 is at the reference position, the one-end side contact surface 22*a* of the one-end side inner stopper portion 22A is in contact with the one-end receiving surface 20*a* of the one-end side stopper 20. A one end surface 5*c* of the connection portion 5A is in contact with the other end surface 21*b* of the other end side stopper 21. Here, the reference position of the operating member 17 is a position where the operating member 17 has not moved in either of the longitudinal directions and is a position where the one surface of the operating member 17 is flush with the one surface of the gripping handle 5, and the other surface of the operating member 17 is flush with the other surface of the gripping handle 5.

When the arm 4 is in the shortest contracted mode and the operating member 17 is at the reference position, the holding member 12 is in the protruding position where it is engaged with the locking hole 18*a*, and the engaging and disengaging member 14 is at the contact position where its distal end is locked in the locked groove 41 of the locked body 33. Thus, the arm 4 cannot be expanded or pivoted.

The operation of the operating handle device 3 when the user 55 sets the arms 4 to the longest expanded mode from the shortest contracted mode will be described. In the arm 4, a state where the inner arm member 19 cannot be operated in the longitudinal direction with respect to the outer arm member 18 is a state when the holding member 12 is urged by elasticity of the holding spring body 13 and is at the protruding position where it is locked in the locking hole 18a (see FIG. 3, for example). Therefore, in order to set the arm 4 from the shortest contracted mode to the longest expanded mode, the holding member 12 needs to be retreated to the inside of the arm 4 from the locking hole 18a. In order to retreat the holding member 12 to the inside of the arm 4 from the locking hole 18A, the user 55 presses the holding release operating portion 17B to the one side in the longitudinal direction.

When the holding release operating portion 17B is pressed to the one side in the longitudinal direction, the bridging member 45 moves to the one side in the longitudinal direction with the movement of the holding release operating portion 17B, and the operated rod 11 moves to the one side in the longitudinal direction with the movement of the bridging member 45. The pressing portion 11A is located on the distal end portion (one end side) of the operated rod 11, and when the operated rod 11 moves to the one side in the longitudinal direction, the inclined surface of the pressing portion 11A presses a pressed portion (reference numeral thereof is omitted) provided inside the holding member 12 toward the inside of the arm 4. Then, the holding member 12 retreats together with the pressed portion to the inside of the arm 4 with respect to the locking hole 18a, and the holding member 12 is located at the retreated position retreated to the inside of the arm 4.

When the holding member 12 is at the retreated position, the holding member 12 does not hold the inner arm member 19 anymore. Thus, the inner arm member 19 can move in the longitudinal direction (the other side in the longitudinal direction) with respect to the outer arm member 18, and the user 55 can expand the arm 4 by gripping the gripping handle 5.

Even in the course of expansion of the arm 4 by the user 55, the holding member 12 is urged toward the outer side of the arm 4 by the holding spring body 13. Thus, the holding member 12 slides in contact with the inner surface of the outer arm member 18. As illustrated in FIG. 6, at the time when the other end side contact surface 22b of the one-end side inner stopper portion 22A is brought into contact with the other end receiving surface 21a of the other end side stopper 21, the holding member 12 reaches the position corresponding to the locking hole 18a on the other side end in the longitudinal direction and protrudes from the locking hole 18a and is locked in the outer arm member 18. Since the holding member 12 is at the protruding position locked in the locking hole 18a, the inner arm member 19 cannot move anymore in the longitudinal direction.

Figure 13:
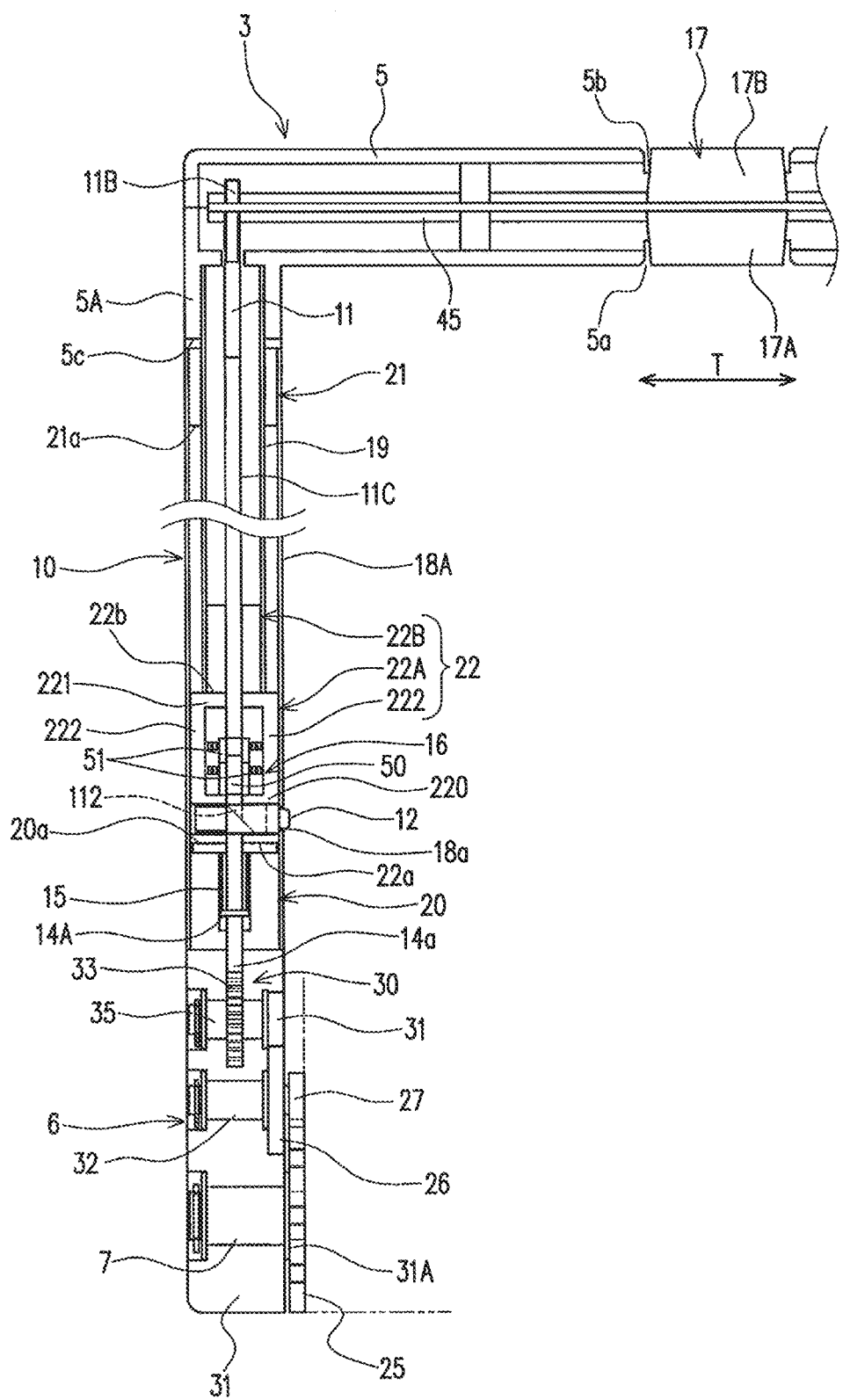
FIG. 13 is an explanatory view illustrating a protruding position of the holding member and a reference position of the operating member.

When the inner arm member 19 is moved toward the other side in the longitudinal direction (also when it is moved toward the one side in the longitudinal direction), as illustrated in FIG. 8, the operating member 17 is set to the holding release position where it has been moved toward the one side in the longitudinal direction. However, by locking the holding member 12 by the locking hole 18a, that is, by moving the pressed portion to the outer side of the arm 4 by elasticity of the holding spring body 13, the operated rod 11 is pressed toward the other side in the longitudinal direction. Then, the bridging member 45 moves toward the other side in the longitudinal direction, the operating member 17 moves together with the bridging member 45 from the other side in the longitudinal direction toward the one side in the longitudinal direction, and as illustrated in FIG. 13, the operating member 17 is returned to the reference position. That is, the holding release position of the operating member 17 is a position corresponding to the retreated position of the holding member 12.

When the user 55 is to set the arm 4 to the shortest contracted mode from the longest expanded mode, the user 55 presses the holding release operating portion 17B toward the one side in the longitudinal direction again. Then, the holding member 12 is moved from the protruding position to the retreated position. Thus, the arm 4 can be set to the shortest contracted mode in which the inner arm member 19 is accommodated to the maximum with respect to the outer arm member 18.

In the longest expanded mode of the arm 4, the operation of the operating handle device 3 when the user 55 inclines the handle body 10 (the arms 4) by a desired angle with respect to the carry case body 2 will be described. For example, by referring to FIGS. 3 and 4, when the engaging and disengaging member 14 is urged to the one side in the longitudinal direction by the elasticity of the locking spring body 15 and the operating member 17 is at the reference position, the engaging and disengaging member 14 is at the contact position where its distal end portion 14a is locked in any one of the locked grooves 41 (the locked projections 40) of the locked body 33. As described above, the reference position of the operating member 17 is also a position corresponding to the protruding position of the holding member 12.

If the distal end portion 14a of the engaging and disengaging member 14 is locked in the locked groove 41 of the locked body 33, the locked body 33 is in a state unrotatable around the regulating shaft 35. If the rotation of the locked body 33 is prohibited, the regulating spur gear 34 coaxial to the locked body 33 is unrotatable, and the medium-diameter spur gear 26 meshed with the regulating spur gear 34 is unrotatable. Moreover, the small-diameter spur gear 27 coaxial to the medium-diameter spur gear 26 is unrotatable, and the large-diameter spur gear 25 meshed with the small-diameter spur gear 27 is unrotatable.

If the large-diameter spur gear 25 is unrotatable, the pivoting center shaft 7 attached to the carry case body 2 is unrotatable and thus, the handle body 10 is unrotatable with respect to the carry case body 2. That is, if the distal end portion 14a of the engaging and disengaging member 14 is locked in the locked groove 41 of the locked body 33, the handle body 10 is unrotatable with respect to the carry case body 2.

Figure 14:
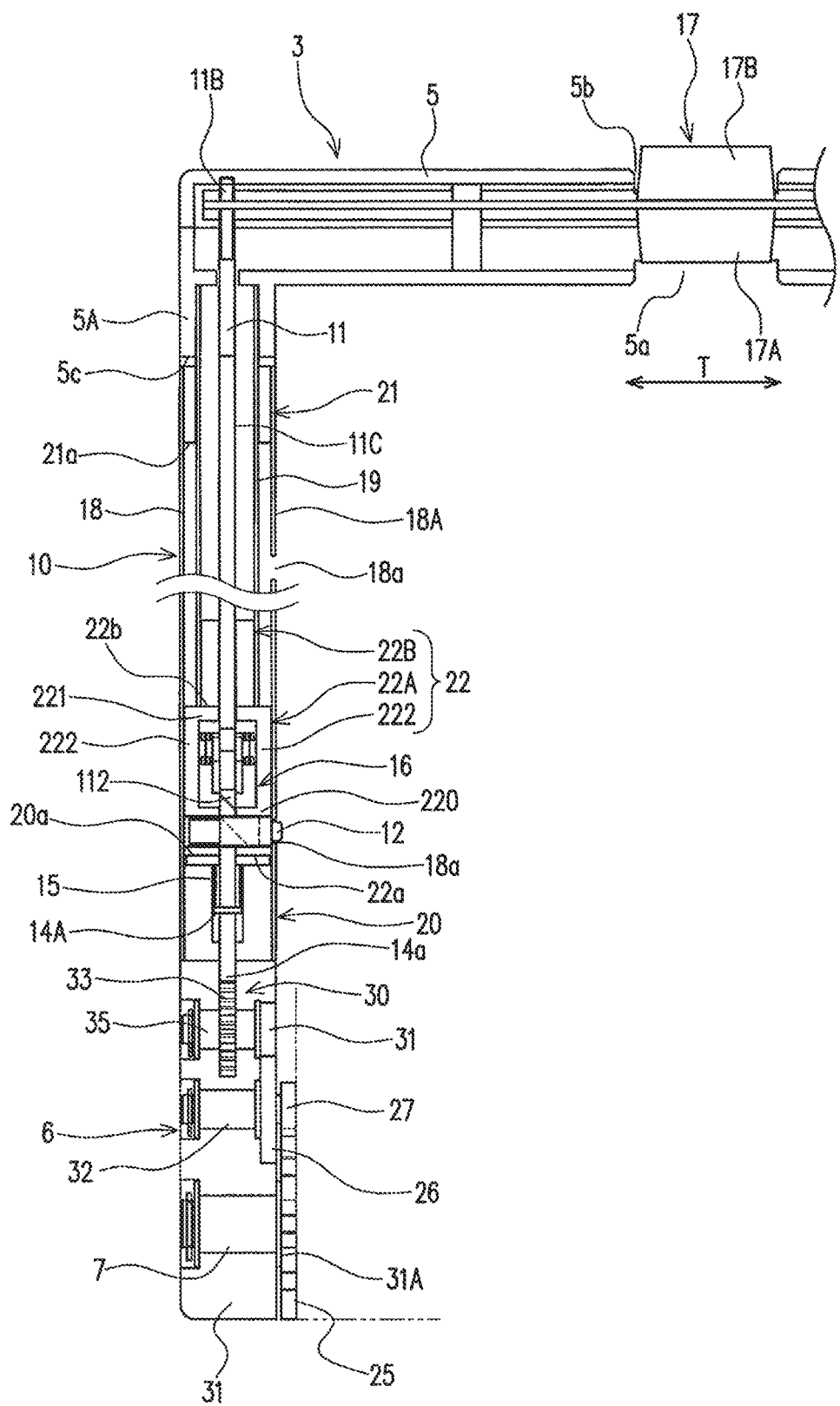
FIG. 14 is an explanatory view illustrating the protruding position of the holding member and an unlocking position of the operating member.

Therefore, in order to set the handle body 10 rotatable with respect to the carry case body 2, the locked body 33 needs to be rotatable. In order to set the locked body 33 rotatable, the engaging and disengaging member 14 is operated so that the engaging and disengaging member 14 is changed from the contact position to the separated position. For that purpose, the user 55 moves the linkage device operating portion 17A of the operating member 17 from the one side in the longitudinal direction to the other side in the longitudinal direction as illustrated in FIG. 14 so as to set the operating member 17 at the unlocking position. Then, the bridging member 45 connected to the operating member 17 is moved to the other side in the longitudinal direction, and the operated rod 11 connected to the bridging member 45 moves to the other side in the longitudinal direction.

Figure 11:
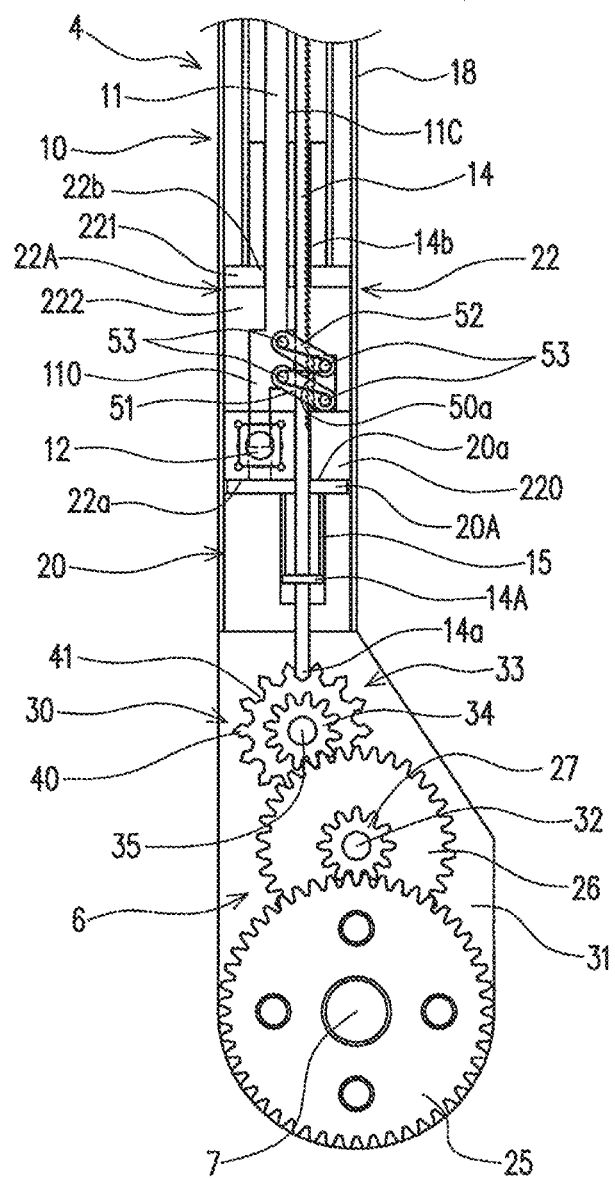
FIG. 11 is an explanatory view of the configuration of the pivoting mechanism and the linkage device in a state where the operated rod has been moved to the other side in the longitudinal direction with respect to the operated rod at a position in FIG. 9.
Figure 12:
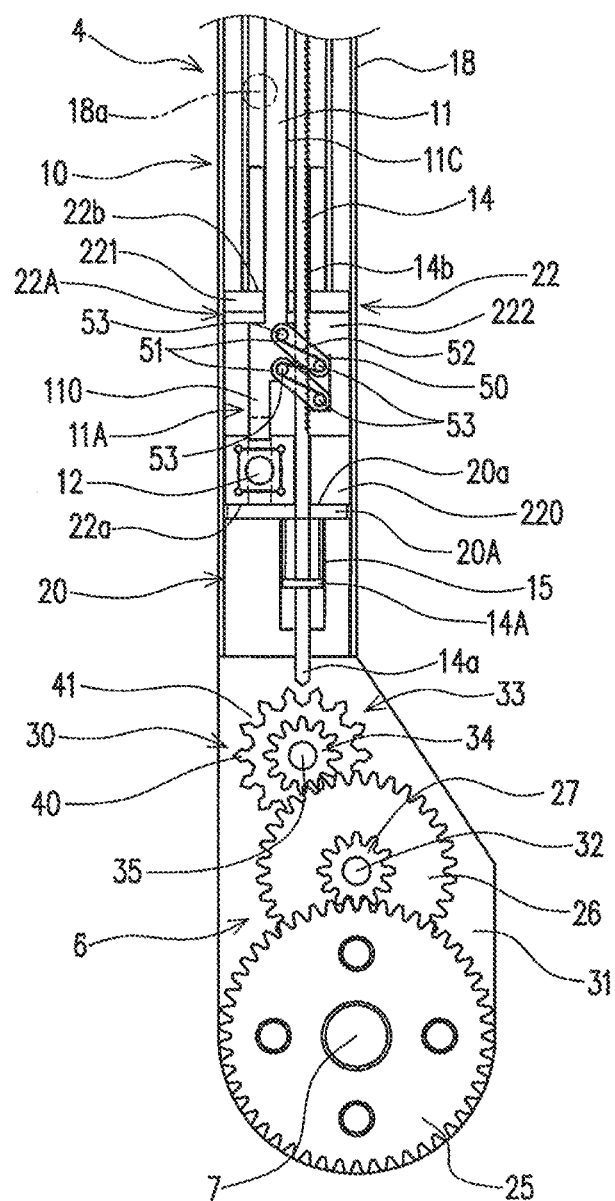
FIG. 12 illustrates a state where the operated rod has moved to the other side in the longitudinal direction with respect to the operated rod at a position in FIG. 11 and the regulating body of the linkage device is locked by the engaging and disengaging member and the engaging and disengaging member is at the separated position out of the locked body of the pivoting mechanism.

If the engaging and disengaging member 14 is at the contact position, the linkage device 16 is in a state which will be described below. That is, one end of the connecting member 51 of the linkage device 16 is connected through the pin 53 to the operated rod 11. The other end of the connecting member 51 is connected to the regulating body 50 through the pin 53. The regulating body 50 is urged to the direction where the locked teeth 50a are locked by the locking teeth 14b by the approaching spring 52. On the other hand, as illustrated in FIGS. 9 and 11, one end surface of the regulating body 50 is in contact with an upper surface of the bottom wall 220 of the one-end side inner stopper portion 22A, whereby further approach of the regulating body 50 to the engaging and disengaging member 14 is limited. Thus, the locked teeth 50a of the regulating body 50 are not locked by the locking teeth 14b.

In such a state of the linkage device 16, the user 55 moves the linkage device operating portion 17A from one side in the longitudinal direction to the other side in the longitudinal direction and sets the operating member 17 to the unlocking position. Then, the operated rod 11 moves to the other side in the longitudinal direction. When the operated rod 11 moves to the other side in the longitudinal direction, the connecting member 51 of the linkage device 16 pivots around the pin 53 and moves to the other side in the longitudinal direction while being urged by elasticity of the approaching spring 52. Since the regulating body 50 is urged by the elasticity of the approaching spring 52, the regulating body 50 pivots around the pin 53 on the width enlarged portion 110 side and approaches the engaging and disengaging member 14 from its side, and the locked teeth 50a are engaged with the locking teeth 14b.

When the locked teeth 50a are engaged with the locking teeth 14b, the engaging and disengaging member 14 is moved toward the other side in the longitudinal direction by its engaging force with movement of the operated rod 11. Thus, the distal end portion 14a of the engaging and disengaging member 14 goes out to the other side in the longitudinal direction with respect to the locked groove 41 of the locked body 33, and the engaging and disengaging member 14 moves to the separated position. When the distal end portion 14a of the engaging and disengaging member 14 goes out of the locked groove 41 of the locked body 33, the locked body 33 becomes rotatable around the regulating shaft 35.

Therefore, the pivoting center shaft 7 becomes rotatable around its axis, and the handle body 10 becomes rotatable with respect to the carry case body 2. Thus, the user 55 can adjust an angle of the handle body 10 with respect to the carry case body 2 to an angle preferred by the user 55 when carrying the carry case body 2.

However, if the distal end portion 14a of the engaging and disengaging member 14 remains out of the locked groove 41 of the locked body 33, even if the handle body 10 is adjusted to the angle with respect to the carry case body 2 convenient for the user 55, the angle cannot be maintained. Thus, the user 55 presses the holding release operating portion 17B of the operating member 17 to the one side in the longitudinal direction and returns the operating member 17 to the reference position.

By moving the operating member 17 to the reference position against the elasticity of the approaching spring 52, the operated rod 11 is moved to the one side in the longitudinal direction for that portion. With that, the engaging and disengaging member 14 integrally linked with the operated rod 11 through the linkage device 16 moves to the one side in the longitudinal direction. Then, the regulating body 50 is brought into contact with the bottom wall 220, and the regulating body 50 moves toward the outer side of the arms 4 along the bottom wall 220. As a result, the locked teeth 50a are separated from the locking teeth 14b. Then, the engaging and disengaging member 14 becomes movable in the longitudinal direction with respect to the operated rod 11 and moves toward the one side in the longitudinal direction, and the distal end portion 14a is locked in any one of the locked grooves 41 of the locked body 33. The distal end portion 14a is locked in the locked grooves 41 of the locked body 33, whereby the locked body 33 becomes unrotatable, and the inclination angle of the handle body 10 with respect to the carry case body 2 is fixed to the angle preferred by the user 55.

Even if the operating member 17 is moved from the unlocking position to the reference position, the pressed portion does not move against the elasticity of the holding spring body 13. Thus, the holding member 12 is at the protruding position, and the inner arm member 19 cannot move in the longitudinal direction. That is, the longest expanded mode is held in the arms 4.

A plurality of the locked grooves 41 are formed in an outer peripheral portion of the locked body 33. Thus, the handle body 10 can be fixed by locking the distal end portion 14a of the engaging and disengaging member 14 in any one of the locked grooves 41 so that it can correspond to the inclination angle of the handle body 10 convenient for the user 55.

In the aforementioned explanation, the case where the handle body 10 is inclined with respect to the carry case body 2 is described. However, the user 55 does not necessarily have to incline the handle body 10 with respect to the carry case body 2. Specifically, the user 55 can also use the handle body 10 by causing it to follow a vertical direction of the carry case body 2.

Figure 15:
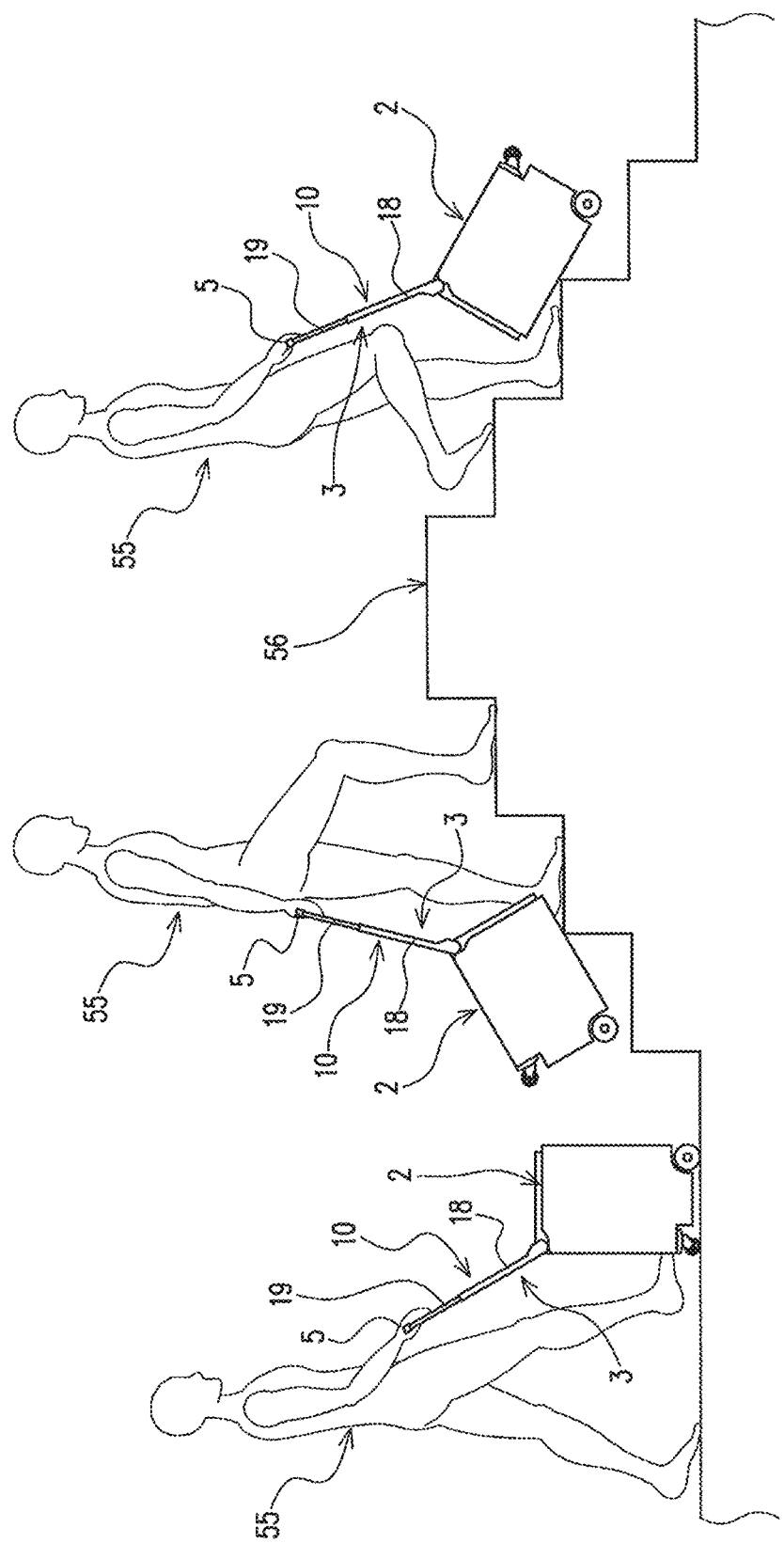
FIG. 15 is an explanatory view illustrating an example of a carrying state of a carry case.

In the carry case 1 of this embodiment, the handle body 10 can be expanded and contracted, and the angle thereof with respect to the carry case body 2 can be also adjusted. Thus, as illustrated in FIG. 15, not only for carrying on a flat surface but if the user 55 is to carry the carry case 1 on stairs 56, the user 55 can carry the carry case body 2 such that the carry case body 2 is in contact with the stairs 56 without using the casters. On ascending stairs and descending stairs, the user 55 can use it by changing the inclination angle of the handle body 10. At this time, the user 55 can easily change the inclination angle of the handle body 10 by performing the operation of pushing the linkage device operating portion 17A and can change the length of the handle body 10 by pushing the holding release operating portion 17B.

Assuming that the carry case body 2 is carried such that it is in contact with the stairs 56, a configuration in which a slide material made of a synthetic resin is attached to an outer surface (a corner part, for example) of the carry case body 2 can be employed. By bringing the slide material into contact with the stairs 56, the user 55 can easily carry the carry case 1.

In the operating handle device 3 of this embodiment, if the holding members 12 are at the retreated position retreated to the insides of the arms 4, the engaging and disengaging member 14 is at the contact position, and the pivoting center shaft 7 is unrotatable. In other words, the retreated position of the holding member 12 is a state where the regulating body 50 of the linkage device 16 is separated from the engaging and disengaging members 14, and the locking teeth 14b and the locked teeth 50a are not meshed with each other.

That is, since the engaging and disengaging member 14 is at the contact position by the elasticity of the locking spring body 15, the pivoting center shaft 7 is unrotatable. Cases where the holding member 12 is at the retreated position retreated to the inside the arm 4 include a case where the user 55 has moved the holding release operating portion 17B to the one side in the longitudinal direction and a case where the user 55 is moving the inner arm member 19 with respect to the outer arm member 18 (the holding member 12 is in contact with the inner surface of the outer arm member 18) by moving the holding release operating portion 17B to the one side in the longitudinal direction.

In summary, the operating handle device 3 according to this embodiment includes the arms 4, the operated rods 11, the holding members 12, the holding spring bodies 13, the engaging and disengaging members 14, the locking spring bodies 15, the linkage device 16, and the operating members 17. Each of the arms 4 includes the outer arm member 18 and the inner arm member 19 movable in the longitudinal direction of the outer arm member 18. The arm 4 has its one end side in the longitudinal direction attached to the carry case body 2, capable of pivoting movement through the pivoting mechanism 6. The operated rods 11 are provided along the longitudinal direction of the arms 4 and are configured movable along the longitudinal direction of the arms 4 together with the inner arm members 19.

The holding member 12 is a member for holding either one of at least two modes that include the longest expanded mode of the arms 4 and the shortest contracted mode of the arms 4. In this case, the longest expanded mode is a state where the inner arm member 19 protrudes to the outer side from the inner side of the arm 4 so as to be engaged with the outer arm member 18, and the inner arm member 19 protrudes to the maximum in the longitudinal direction with respect to the outer arm member 18. The shortest contracted mode is a state where the inner arm member 19 is accommodated to the maximum in the longitudinal direction with respect to the outer arm member 18.

The holding spring body 13 urges the holding member 12 toward the protruding position where the holding member 12 protrudes to the outer arm member 18 side and is locked by the outer arm member 18. The engaging and disengaging member 14 can be engaged with and disengaged from the pivoting mechanism 6. The locking spring body 15 urges the engaging and disengaging member 14 to the direction that is the contact position where the engaging and disengaging member 14 is brought into contact with the pivoting mechanism 6 and holds it non-rotationally.

The operating member 17 is configured switchable among the holding release position where it has been moved to the one direction along the longitudinal direction of the arms 4, the unlocking position where it has been moved to the other direction along the longitudinal direction of the arms 4, and the reference position between the holding release position and the unlocking position. That is, the operating member 17 is configured capable of the moving operation of the operated rod 11 in the one direction and the other direction along the longitudinal direction of the arms 4 for a distance corresponding to a distance between the retreated position where the holding member 12 is retreated to the inside of the arm and the protruding position. Moreover, the operating member 17 is configured capable of the moving operation of the operated rod 11 in the one direction and in the other direction along the longitudinal direction of the arms 4 for a certain distance corresponding to a distance between the contact position of the engaging and disengaging member 14 and the separated position where the engaging and disengaging member 14 has been separated from the pivoting mechanism 6. This operating member 17 is connected to the operated rod 11.

The linkage device 16 is configured to link the operated rod 11 and the engaging and disengaging member 14 by the moving operation for moving the operating member 17 to the other direction for a certain distance. The linkage device 16 has a function of changing the engaging and disengaging member 14 at the contact position to the separated position by linking the operated rod 11 and the engaging and disengaging member 14 and thereby moving both the operated rod 11 and the engaging and disengaging member 14 in the other direction.

The holding release position of the operating member 17 corresponds to the retreated position of the holding member 12, the unlocking position of the operating member 17 corresponds to the separated position of the engaging and disengaging member 14. The reference position of the operating member 17 corresponds to the protruding position of the holding member 12, and corresponds to the contact position of the engaging and disengaging member 14.

In the aforementioned configuration, in the state where the engaging and disengaging member 14 is at the contact position where the pivoting mechanism 6 is held non-rotationally by the elasticity of the locking spring body 15, if the operating member 17 is moved to the other direction for a certain distance, the operated rod 11 moves to the other direction along the longitudinal direction of the arms 4 with the movement of the operating member 17. When the operating member 17 is moved to the other direction for the certain distance, the engaging and disengaging member 14 is linked with the operated rod 11 by the linkage device 16 and the engaging and disengaging member 14 is also moved to the other direction, and the engaging and disengaging member 14 at the contact position moves to the separated position. When the engaging and disengaging member 14 has moved to the separated position, the arms 4 become capable of pivoting movement with respect to the mounted body through the pivoting mechanism 6 on the basis of the one end side of the longitudinal direction thereof.

In the aforementioned configuration, when the operating member 17 is at the holding release position, the holding member 12 is at the retreated position and does not regulate expansion and contraction of the arms 4. When the operating member 17 is at the unlocking position, the engaging and disengaging member 14 is at the separated position and does not regulate the movement of the pivoting mechanism 6. When the operating member 17 is at the reference position, the holding member 12 is at the protruding position and protrudes to the outer arm member 18 side and is locked by the outer arm member 18 so as to regulate expansion and contraction of the arms 4. When the operating member 17 is at the reference position, the engaging and disengaging member 14 is at the contact position and holds the pivoting mechanism 6 non-rotationally.

As described above, the operating handle device 3 of this embodiment includes, the arm 4 having the outer arm member 18 and the inner arm member 19 movable along the longitudinal direction of the outer arm member 18 so as to be capable of being accommodated in the outer arm member 18, in which the pivoting mechanism 6 is provided on the arm 4, and the one end side in the longitudinal direction of the arm 4 is attached to the mounted body 2, capable of pivoting movement through the pivoting mechanism 6;

the operated rod 11 provided along the longitudinal direction of the arm 4 and movable along the longitudinal direction of the arm 4 together with the inner arm member 19;

the holding member 12 attached to the inner arm member 19 so as to be movable between the protruding position protruding to the outer side of the arm 4 from the inner side of the arm 4 and the retreated position retreated to the inner side of the arm 4 and holding at least two modes that include the longest expanded mode of the arm 4 in which the inner arm member 19 protrudes to the maximum in the longitudinal direction of the arm 4 with respect to the outer arm member 18 by being located at the protruding position so as to be engaged with the outer arm member 18 and the shortest contracted mode of the arm 4 in which the inner arm member 19 is accommodated to the maximum in the longitudinal direction of the arm 4 with respect to the outer arm member 18;

the holding spring body 13 for urging the holding member 12 at the protruding position where the holding member 12 protrudes to the outer arm member 18 side and is locked by the outer arm member 18;

the engaging and disengaging member 14 capable of being engaged with and disengaged from the pivoting mechanism 6;

the locking spring body 15 for urging the engaging and disengaging member 14 in the direction which becomes the contact position where the engaging and disengaging member 14 is brought into contact with the pivoting mechanism 6 and the engaging and disengaging member 14 holds the pivoting mechanism 6 non-rotationally;

the operating member 17 connected to the operated rod 11, capable of the moving operation of the operated rod 11 in the one direction and the other direction along the longitudinal direction of the arm 4 for the distance corresponding to the distance between the retreated position and the protruding position of the holding member 12 and the distance corresponding to the distance between the contact position of the engaging and disengaging member 14 and the separated position where the engaging and disengaging member 14 is separated from the pivoting mechanism 6; and the linkage device 16 for moving both the operated rod 11 and the engaging and disengaging member 14 in the other direction by linking the operated rod 11 and the engaging and disengaging member 14 to each other so as to change the engaging and disengaging member 14 at the contact position to the separated position when the moving operation for moving the operating member 17 in the other direction for the certain distance is performed.

In the aforementioned configuration, if the holding member 12 is at the protruding position engaged with the outer arm member 18 by protruding to the outer side from the inner side of the arm 4 by the elasticity of the holding spring body 13, the inner arm member 19 is held in the state incapable of being expanded and contracted with respect to the outer arm member 18. When the operating member 17 is moved to the one direction for the certain distance against the elasticity of the holding spring body 13, the operated rod 11 moves to the one direction along the longitudinal direction of the arm 4 with the movement of the operating member 17, the holding member 12 at the protruding position is set to the retreated position, and the inner arm member 19 in the arm 4 becomes capable of being expanded and contracted with respect to the outer arm member 18 between the longest expanded mode and the shortest contracted mode.

When the operating member 17 is moved to the other direction for the certain distance in the state where the engaging and disengaging member 14 is at the contact position where the pivoting mechanism 6 is held non-rotationally by the elasticity of the locking spring body 13, the operated rod 11 moves to the other direction along the longitudinal direction of the arm 4 with the movement of the operating member 17. With the movement of the operated rod 11, the engaging and disengaging member 14 moves to the other direction by linkage with the operated rod 11 by the linkage device 16. As a result, the engaging and disengaging member 14 located at the contact position is located at the separated position, and the arm 4 becomes pivotable on the basis of the one end side in its longitudinal direction with respect to the mounted body 2 through the pivoting mechanism 6.

In the operating handle device 3 of this embodiment, such configuration can be employed that the arms 4 are provided in parallel as a pair at an interval, the other end sides in the longitudinal direction of the both arms 4 are connected by the gripping handle 5, and the operating member 17 is provided on the gripping handle 5.

In the aforementioned configuration, the one end sides in the longitudinal direction of the arms 4 are mounted to the mounted body 2, capable of pivoting movement through the pivoting mechanism 6, the operating member 17 is moved in the one direction for the certain distance so as to expand and contract the arms 4, and the operating member 17 is moved in the other direction for the certain distance so that the arms 4 are pivoted around the pivoting mechanism 6.

In the operating handle device 3 of this embodiment, such configuration can be employed that the operating member 17 is configured switchable among the holding release position where it has been moved in the one direction along the longitudinal direction of the arms 4, the unlocking position where it has been moved in the other direction along the longitudinal direction of the arms 4, and the reference position between the holding release position and the unlocking position, and the holding release position of the operating member 17 corresponds to the retreated position of the holding member 12, the unlocking position of the operating member 17 corresponds to the separated position of the engaging and disengaging member 14, and the reference position of the operating member 17 corresponds to the protruding position of the holding member 12 and the contact position of the engaging and disengaging member 14.

In the aforementioned configuration, when the operating member 17 is at the holding release position, the holding member 12 is at the retreated position and does not regulate expansion and contraction of the arms 4. When the operating member 17 is at the unlocking position, the engaging and disengaging member 14 is at the separated position and does not regulate the movement of the pivoting mechanism 6. When the operating member 17 is at the reference position, the holding member 12 is at the protruding position and protrudes to the outer arm member 18 side and is locked by the outer arm member 18 so as to regulate expansion and contraction of the arms 4. When the operating member 17 is at the reference position, the engaging and disengaging member 14 is at the contact position and holds the pivoting mechanism 6 non-rotationally.

In the operating handle device 3 of this embodiment, such configuration can be employed that the operating members 17 are provided in a pair on the one side and on the other side of the gripping handle 5.

In the aforementioned configuration, by moving the operating member 17 from the other side of the gripping handle 5 to the one direction to locate it at the holding release position, the holding member 12 moves from the protruding position to the retreated position, while by moving the operating member 17 from the one side of the gripping handle 5 to locate it at the other direction to the unlocking position, the engaging and disengaging member 14 moves from the contact position to the separated position.

In the operating handle device 3 of this embodiment, such configuration can be employed that the pivoting mechanism 6 includes the pivoting center shaft 7 which is the pivoting center of the arms 4, the locked body 33 which includes the locked groove 41 in which the engaging and disengaging member 14 can be locked in the outer peripheral portion and is rotatable around the support shaft arranged in parallel with the pivoting center shaft 7 and the gear group dynamically connecting the pivoting center shaft 7 and the support shaft.

In the aforementioned configuration, if the engaging and disengaging member 14 is at the contact position where it is locked in the locked groove 41 of the locked body 33, the locked body 33 is unrotatable, each of the gears of the gear group is unrotatable, and the arms 4 cannot pivot around the pivoting mechanism 6. If the engaging and disengaging member 14 is at the separated position where it is separated from the locked groove 41 of the locked body 33, the locked body 33 is rotatable, each of the gears of the gear group is rotatable, and the arms 4 can pivot around the pivoting mechanism 6.

According to the operating handle device 3 according to this embodiment, by operating the operating member 17, locking and unlocking of expansion and contraction of the arms 4 and locking and unlocking of pivoting movement of the arms 4 can be performed.

The operating handle device 3 according to the present invention is not limited to the aforementioned embodiment and can be subjected to various changes within a range not departing from the gist of the present invention. For example, in the aforementioned embodiment, the case where the operating handle device 3 is used for the carry case 1 is described. However, the operating handle device 3 of the present invention can be attached to carrying tools such as a trolley, a walking assistant cart and the like as the operating handle devices for them. Moreover, it is also possible to mount it to a bicycle to use it as the operating handle device capable of changing a length and an angle.

When it is used for the carry case 2 or other carrying tools, the arms 4 are not necessarily provided in a pair but may be a single body. The linkage device 16 is configured to link the operated rod 11 and the engaging and disengaging member 14 by locking between the teeth, but configuration that the operated rod 11 and the engaging and disengaging member 14 are linked by pressure contact can be employed.

The configuration that the operating member 17 is formed by integrally providing the linkage device operating portion 17A and the holding release operating portion 17B is described. However, in order to operate the bridging member 45, the linkage device operating portion 17A and the holding release operating portion 17B may be separate bodies. Moreover, the number of the linkage device operating portions 17A and the holding release operating portions 17B are not limited to one each, but particularly by paying attention to the operation of the linkage device operating portion 17A which is gripped by the user, configuration that they are arranged separately in the longitudinal direction of the gripping handle 5 can be employed.

Figure 16:
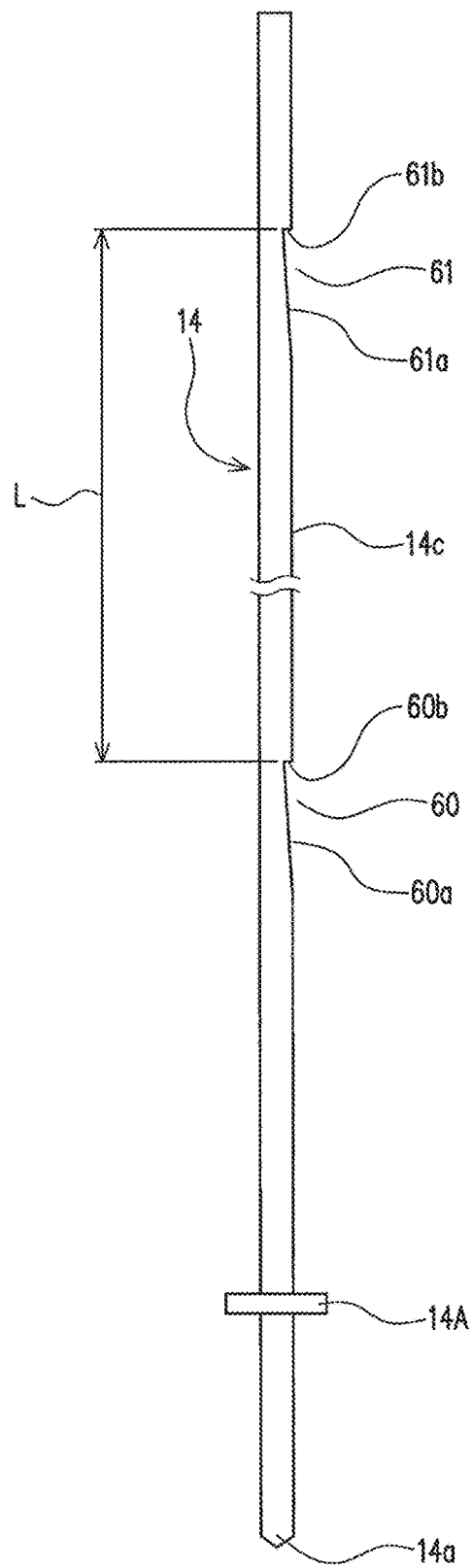
FIG. 16 is a single body side view of the engaging and disengaging member in an operating handle device according to another embodiment of the present invention.
Figure 17:
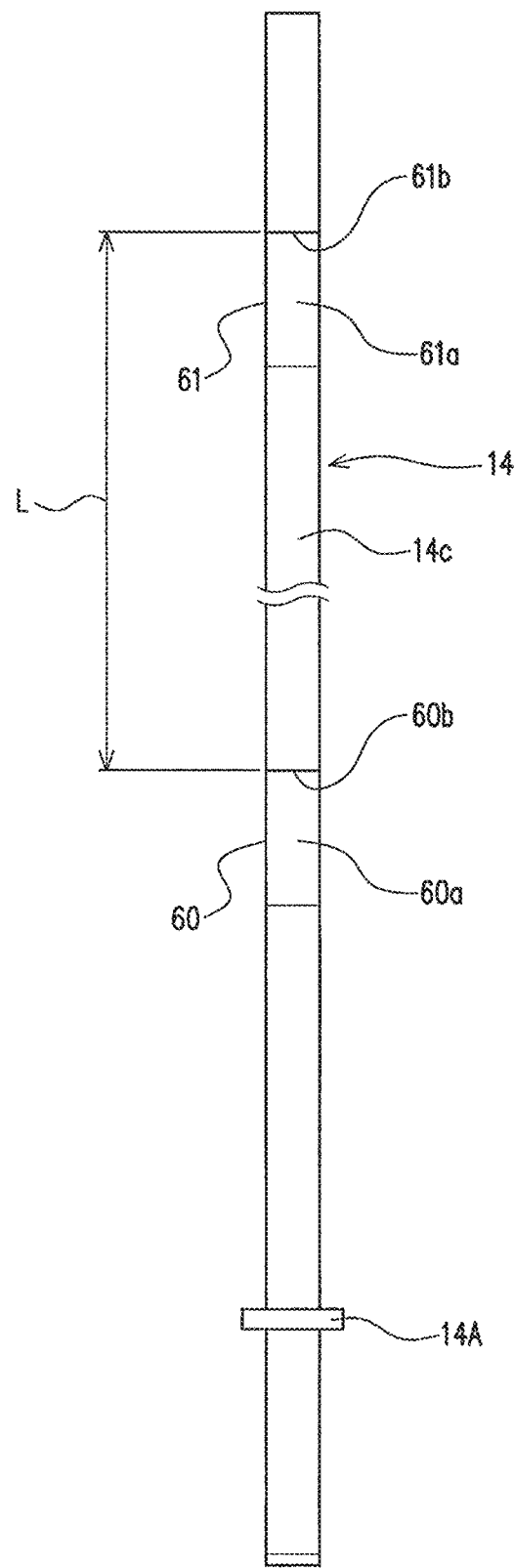
FIG. 17 is a single body rear view of the engaging and disengaging member of the same.

In the aforementioned embodiment, the case where a large number of continuous locking teeth 14b in the serrated shape are formed as the locking portion of the engaging and disengaging member 14 is exemplified. However, as illustrated in FIGS. 16 and 17, the locking portion may be locking teeth 60 and 61 separated in the longitudinal direction of the engaging and disengaging member 14 and formed at two places of a middle portion in the longitudinal direction. In the longitudinal direction of the engaging and disengaging member 14, the separation distance between the locking teeth 60 and 61 is set to a distance corresponding to a moving distance of the inner arm member 19 between the shortest contracted mode and the longest expanded mode of the arms 4.

Each of the locking teeth 60 and 61 is formed as a triangular recess portion. That is, each of the locking teeth 60 and 61 includes inclined surfaces 60a and 61a formed on an outer surface of the engaging and disengaging member 14 and locking surfaces 60b and 61b rising from ends of the inclined surfaces 60a and 61a, respectively. A separation distance L between the locking teeth 60 and 61 is specified as a distance between the locking surfaces 60b and 61b. A space between the locking teeth 60 and 61 is made a flat surface 14c.

Figure 18:
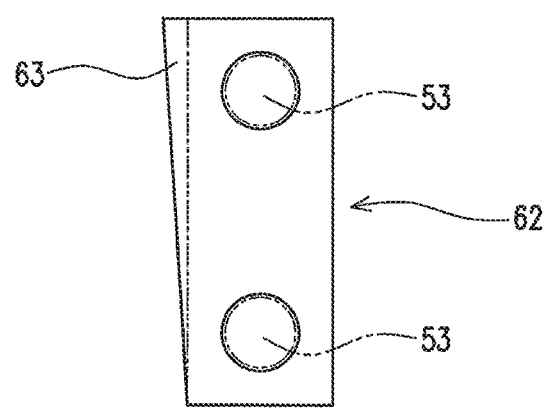
FIG. 18 is a single body side view of the regulating body of the same.
Figure 19:
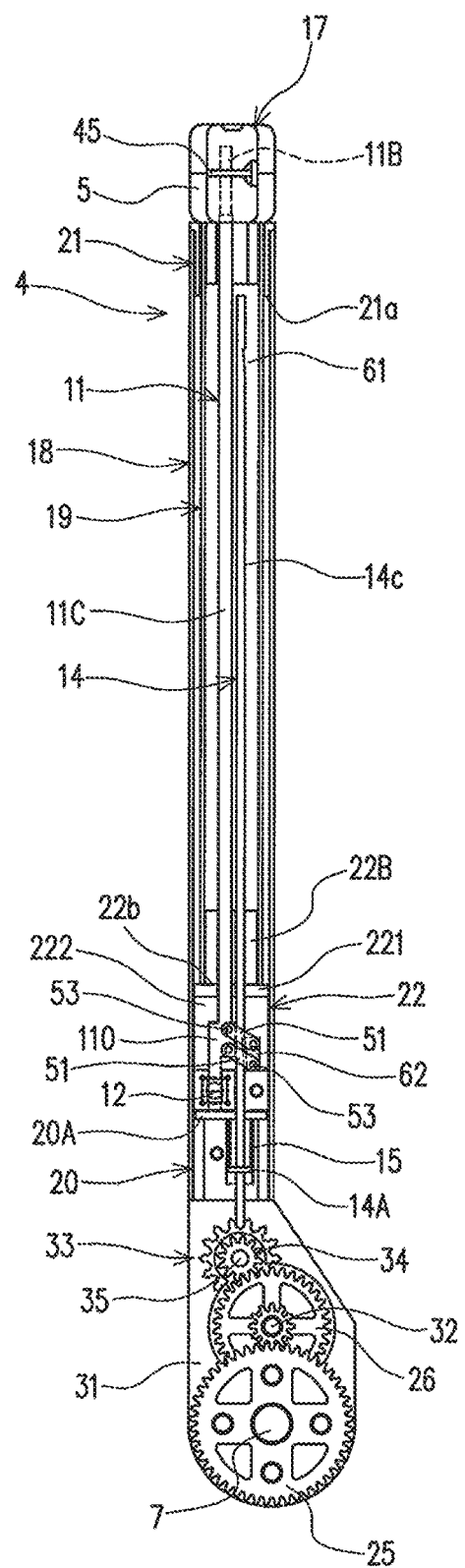
FIG. 19 is a side view illustrating an internal structure of the operating handle device of the same and illustrates a shortest contracted mode of the arm.
Figure 20:
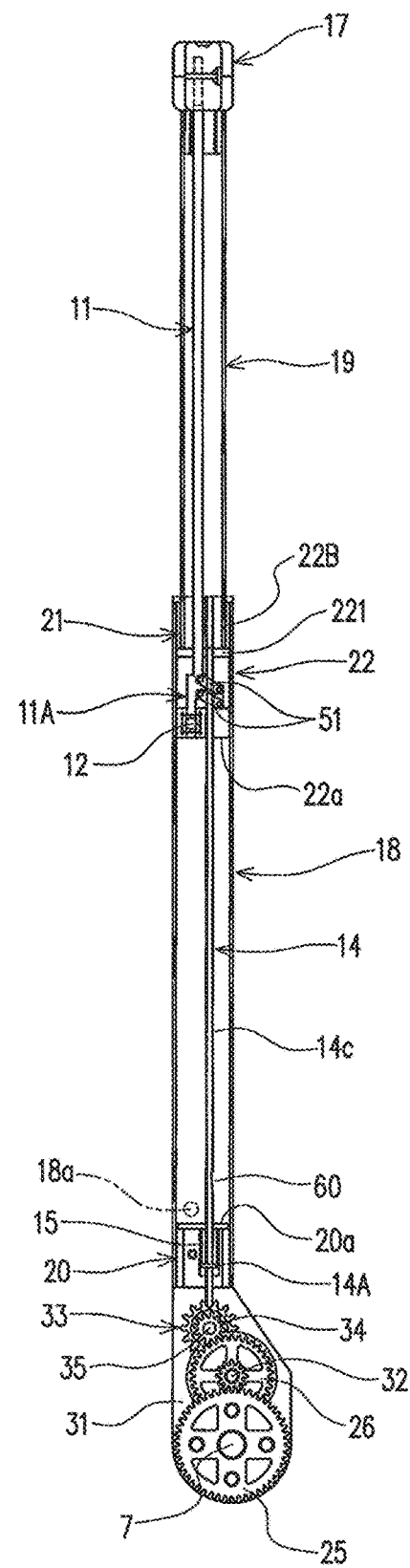
FIG. 20 is a side view of the same and illustrates a longest expanded mode of the arm.

As illustrated in FIGS. 18 to 20, the regulating body 62 is internally fitted in the inner stopper 22 and arranged on the side of the engaging and disengaging member 14 and is formed having a cuboid plate shape. In the regulating body 62, locked tooth 63 capable of being engaged with and disengaged from either one of the locking teeth 60 and 61 in accordance with a position of the regulating body 62 is formed on surfaces facing the locking teeth 60 and 61. The locked tooth 63 is formed having a triangular shape so as to correspond to each of the locking teeth 60 and 61. In the regulating body 62, one piece of such locked tooth 63 is formed on the surface facing the engaging and disengaging member 14.

In this embodiment, the locking hole 18a only needs to be formed at positions corresponding to the shortest contracted mode and the longest expanded mode of the arms 4. Therefore, in this embodiment, the locking hole 18a is formed at two places of the outer arm member 18. Since the configuration of the other portions is similar to the aforementioned embodiment described on the basis of FIGS. 1 to 15, the same reference numerals are given and the explanation shall not be repeated.

According to the operating handle device 3 incorporating the engaging and disengaging member 14 and the regulating body 62 with the aforementioned configuration, in the shortest contracted mode of the arms 4, the locked tooth 63 of the regulating body 62 is locked by the locking tooth 60 on one side in the longitudinal direction (on the spring seating ring 14A side). In the longest expanded mode of the arms 4, the locked tooth 63 of the regulating body 62 is locked by the locking tooth 61 on the other side in the longitudinal direction. Specifically, by locking of the locked tooth 63 by either one of the locking surfaces 60b and 61b of the locking teeth 60 and 61, movement of the inner arm member 19 is regulated.

For example, when the user 55 is to move the inner arm member 19 with respect to the outer arm member 18 in order to set the arm 4 to the longest expanded mode from the shortest contracted mode, the locked tooth 63 of the regulating body 62 moves while sliding on the flat surface 14c between the locking teeth 60 and 61. Even if the locked tooth 63 slides on the surface between the locking teeth 60 and 61, since the flat surface 14c extends between the locking teeth 60 and 61, a behavior of the regulating body 62 during the movement of the regulating body 62 is suppressed. Moreover, since the space between the locking teeth 60 and 61 is made the flat surface 14c, a sliding noise when the locked tooth 63 moves between the locking teeth 60 and 61 can be reliably suppressed.

In the embodiment illustrated in FIGS. 16 to 20, the locking teeth 60 and 61 are arranged at the two positions, which are positions corresponding to the shortest contracted mode and the longest expanded mode of the arms 4. However, another locking tooth having the same configuration (shape) can be formed at an intermediate position between the locking teeth 60 and 61, for example. In this case, by forming the locking hole 18a at positions corresponding to the shortest contracted mode, to the longest expanded mode, and to the middle of them of the arms 4, the arms 4 can be used in the shortest contracted mode, the longest expanded mode, and the mode at the intermediate position thereof. Since the other operational effects are similar to those of each of the aforementioned embodiments, the explanation shall not be repeated.

The operating handle device of this embodiment is described above, but the present invention is not limited to the aforementioned embodiment but its design can be changed as appropriate within the range intended by the present invention. Moreover, the operational effects of the present invention are not limited to the aforementioned embodiment, either. That is, the embodiment disclosed this time is exemplification in all the points and should be considered not limiting. The range of the present invention is illustrated not by the aforementioned explanation but by the appended claims. Moreover, it is intended that the scope of the present invention includes all the changes in the meaning equal to and within the scope of the appended claims.

What is claimed is:

1. A linkage mechanism for use in an arm of an operating handle device of a carrying tool, which comprises: a first rod member (11) and a second rod member (12) arranged in an arm having a cylindrical shape and extending along a lengthwise direction of the arm,
    a regulating body (50) arranged in alignment with the first rod member with the second rod member therebetween; and
    a connecting member (51) connecting the first rod member with the regulating body and having a first end pivotably attached to the first rod member, and a second end pivotably attached to the regulating body, wherein the first rod member is configured to move in one direction and the other direction along the longitudinal direction of the arm in association with an operating member provided on the gripping handle to be moved by an operation of the operating member by a user,
    the second rod member is configured to move in one direction and the other direction along the longitudinal direction of the arm in association with the first rod member, the regulating body comprises locking teeth formed on a surface facing the second rod member, the second rod member comprises locked teeth formed to face the locking teeth and to be meshed with the locking teeth, and
    the locking teeth are configured to approach the locked teeth, in a direction orthogonal to the lengthwise direction, and to be meshed with the locked teeth with the movement of the first rod member to the one direction in the longitudinal direction, and configured to be separated from the locked teeth with the movement of the first rod member to the other direction in the longitudinal direction.

2. The linkage mechanism according to claim 1, further comprising an inner stopper configured to regulate the movement of the regulating body in the moving direction of the first rod member.

3. The linkage mechanism according to claim 1, wherein
    the arm is configured to be expandable and contractible and configured to be pivotally movable with respect to the carrying tool,
    the first rod member is an operated rod configured to regulate expansion and contraction of the arm with the movement of the first rod member to the one direction in the longitudinal direction, and configured to enable the expansion and contraction of the arm with the movement of the first rod member to the other direction in the longitudinal direction, and
    the second rod member is an engaging and disengaging member configured to allow the arm to be pivotally movable with the movement of the second rod member to the one direction in the longitudinal direction, and configured to regulate pivotal movement of the arm with the movement of the second rod member to the other direction in the longitudinal direction.

\* \* \* \* \*